(12) United States Patent
Nakajima et al.

(10) Patent No.: US 9,758,001 B2
(45) Date of Patent: Sep. 12, 2017

(54) AUTOCLAVE AND TIRE MANUFACTURING METHOD

(75) Inventors: Yohei Nakajima, Kodaira (JP); Kai Honda, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 520 days.

(21) Appl. No.: 14/232,973

(22) PCT Filed: Jul. 13, 2012

(86) PCT No.: PCT/JP2012/067902
§ 371 (c)(1),
(2), (4) Date: Feb. 12, 2014

(87) PCT Pub. No.: WO2013/011934
PCT Pub. Date: Jan. 24, 2013

(65) Prior Publication Data
US 2014/0158284 A1    Jun. 12, 2014

(30) Foreign Application Priority Data

Jul. 15, 2011    (JP) .................................. 2011-157048
Oct. 25, 2011    (JP) .................................. 2011-233886

(51) Int. Cl.
*B29C 35/04*    (2006.01)
*B60C 99/00*    (2006.01)
(Continued)

(52) U.S. Cl.
CPC .......... *B60C 99/00* (2013.01); *B29C 35/0227* (2013.01); *B29D 30/0601* (2013.01); *B29C 35/045* (2013.01)

(58) Field of Classification Search
CPC .......................... B29C 35/0227; B29C 35/045
See application file for complete search history.

(56) References Cited

U.S. PATENT DOCUMENTS 4,974,663 A * 12/1990 Nakaji ....................... B01J 3/04
165/58
2004/0086586 A1    5/2004 Lahmann et al.
2010/0298979 A1   11/2010 Christopher et al.

FOREIGN PATENT DOCUMENTS

CN    101808790 A    8/2010
JP    A-01-110135    4/1989
(Continued)

OTHER PUBLICATIONS

Sep. 15, 2015 Office Action issued in Chinese Patent Application No. 201280043976.6.
(Continued)

*Primary Examiner* — Donald Spamer
(74) *Attorney, Agent, or Firm* — Oliff PLC

(57) ABSTRACT

The invention provides an autoclave capable of creating a uniform temperature distribution inside a pressurized chamber and a method for manufacturing tires using the autoclave. The autoclave shaped as a cylindrical pressurized chamber has a heat source and a fan disposed on one end side thereof and ducts extending lengthwise on the inner peripheral wall surface thereof to discharge air blown by the fan to the other end side thereof. And the air outlets of the ducts are so designed as to discharge the air blown by the fan in a circumferential direction of the pressurized chamber.

9 Claims, 11 Drawing Sheets

(51) Int. Cl.
B29C 35/02 (2006.01)
B29D 30/06 (2006.01)

(56) References Cited

FOREIGN PATENT DOCUMENTS

| | | |
|---|---|---|
| JP | A-02-014730 | 1/1990 |
| JP | A-04-144714 | 5/1992 |
| JP | A-06-007665 | 1/1994 |
| JP | A-2006-088049 | 4/2006 |
| JP | A-2008-500898 | 1/2008 |
| JP | A-2009-000838 | 1/2009 |
| JP | 2009-190377 A | 8/2009 |
| JP | A-2010-540279 | 12/2010 |
| JP | 2011-012945 A | 1/2011 |
| JP | 2011-056693 A | 3/2011 |

OTHER PUBLICATIONS

Sep. 16, 2014 Office Action issued in Japanese Application No. 2011-157048.
Sep. 16, 2014 Office Action issued in Japanese Application No. 2011-233886.
Oct. 2, 2012 International Search Report issued in International Application No. PCT/JP2012/067902.
Jan. 21, 2014 International Preliminary Report on Patentability issued in International Application No. PCT/JP2012/067902.
Feb. 24, 2015 European Search Report issued in European Patent Application No. EP 12 81 4962.

\* cited by examiner

BLOCKED END SIDE ↔ OPENABLE END SIDE

FIG.17(a)
FIG.17(b)
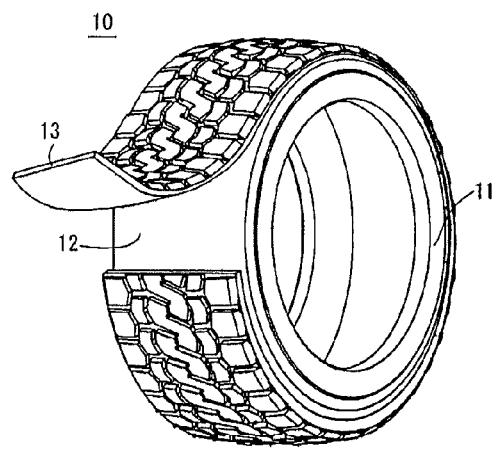
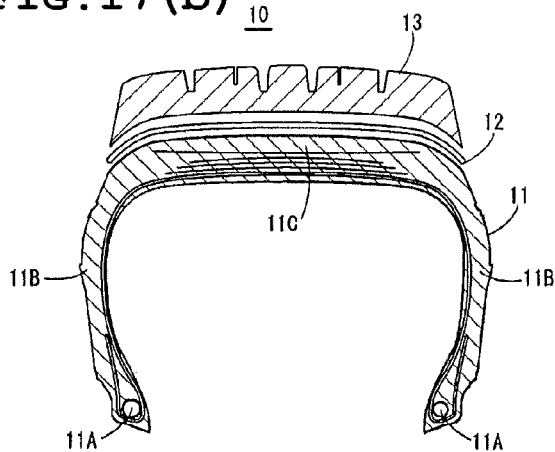
FIG.18(a) AIRFLOW DISTRIBUTION
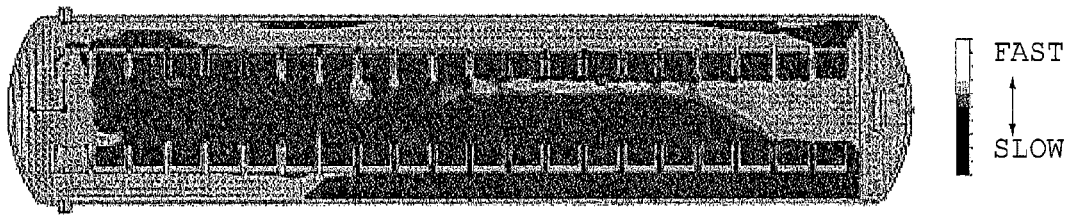
FAST
↕
SLOW
FIG.18(b) TEMPERATURE DISTRIBUTION
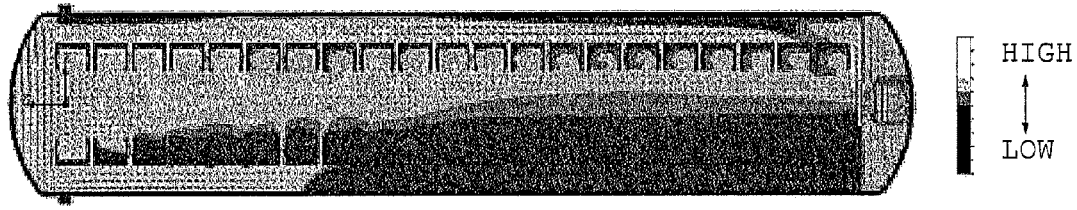
HIGH
↕
LOW
FIG.18(c) AIRFLOW DISTRIBUTION
FAST
↕
SLOW

AUTOCLAVE AND TIRE MANUFACTURING METHOD

BACKGROUND OF THE INVENTION

1. Field of the Invention

The present invention relates to an autoclave suitably used in cure-molding tires and, more particularly, to an autoclave capable of creating a uniform temperature distribution therein and a tire manufacturing method using such an autoclave.

2. Description of the Related Art

A curing process is known as one of the processes in a method for fabricating tires called retreaded tires. In the curing process, a base tire, which serves as the base of a tire, and tread rubber, which is to be bonded to the periphery of the base tire, are placed in a curing envelope (hereafter "envelope" also). Then the envelope is introduced into an autoclave with the pressure inside the envelope reduced. In this manner, the cushion rubber, which is a bonding layer placed between the base tire and the tread rubber, is cured, thereby integrating the two tire members together firmly.

The autoclave used in the curing process is a cylindrical pressurized chamber capable of holding therein a plurality of tire sets (base tire and tread rubber) placed in their respective curing envelopes. The cylindrical pressurized chamber has a heat source disposed at one end side thereof to heat the air inside the pressurized chamber, a fan disposed near the heat source to circulate the air heated by the heat source, and an airtight door openably disposed at the other end side in the lengthwise direction thereof.

Also, disposed on the inner wall surface of the pressurized chamber is a duct extending lengthwise along the pressurized chamber. The air heated by the heat source is sent into the duct by the fan, and the air passing through the duct is discharged on the side where the airtight door is provided on the side opposite from the fan.

Then the air discharged at the airtight door side runs into the wall surface of the airtight door and is sent back toward the fan side in the pressurized chamber. The air, as it flows, heats the plurality of tire sets held within the pressurized chamber before it reaches the heat source. Again the air is driven through the duct by the fan and discharged on the airtight door side.

In other words, the autoclave is of such construction that the plurality of tire sets held therein are heated as the air heated in a pressurized chamber is circulated in the lengthwise direction of the chamber. Also, the pressure within the pressurized chamber is maintained at about 6 to 8, for instance, and the curing of the base tires and tread rubbers inside the curing envelopes progresses as they are heated under the pressure.

RELATED DOCUMENT

Patent Document

Patent Document 1: Japanese Unexamined Patent Application Publication No. 2006-88049
Patent Document 2: Japanese Unexamined Patent Application Publication No. 2008-500898

SUMMARY OF THE INVENTION

Problem to be Solved by the Invention

However, as is clear from an airflow distribution shown in FIG. 18A, the air discharged at the airtight door side of a conventional autoclave tends to rise in rising currents before it flows toward the fan side in the pressurized chamber. Thus the air moves briskly in the upper part of the chamber, but it can become stagnant in the lower part of it.

Also, as is clear from a temperature distribution shown in FIG. 18B, the differences in airflow distribution within the pressurized chamber are translated into the differences in temperature distribution within the pressurized chamber. In particular, the slowed temperature rise in the stagnant flow region presents a problem of making the curing time longer.

For example, one method conceivable for suppressing the occurrence of rising currents is by raising the speed of the air discharged at the airtight door side and flowing toward the fan side in the pressurized chamber. In this regard, an experiment to see the air currents and temperature distribution inside the pressurized chamber was conducted using a centrifugal fan, which was capable of sending out large volumes of air current, thereby raising the speed of air flowing from the airtight door side to the fan side. As a result, it was found that the air currents, after running into the airtight door, move back, hugging the lower part of the pressurized chamber as shown in FIG. 18C. This, however, did not produce a satisfactory effect although it could slightly reduce the variation in temperature within the pressurized chamber by controlling the stagnation of air in the lower part of the chamber.

Also, another method conceivable for suppressing the occurrence of rising currents is by changing the flows of air (air currents) within the chamber, instead of simply raising the speed of the air flowing toward the fan side from the airtight door side. In such a method, the air from the discharge outlet of the duct may, for instance, be discharged in the same circumferential direction along the inner wall surface of the pressurized chamber to cause a swirling flow within the chamber. In this method, a reduction of variation in temperature can be expected because the whole air can be moved from the airtight door side to the fan side by the swirling flow within the pressurized chamber. However, the swirling flow cannot be fully controlled by simply discharging the air from the duct in the same circumferential direction, so that a desired degree of effect cannot be achieved.

Further, the curing is normally done by holding a plurality of tire sets in the pressurized chamber. And the thermal histories of the respective tires given by the heated air can differ from position to position within the chamber because of the non-uniform temperature distribution. Thus, due to the differences in thermal history, there remain concerns that variation in tire quality may result even though the tires are cured inside the same autoclave. In particular, the differences in thermal history are considered to affect the rolling resistance of the tires. And therefore there are concerns that variation in the rolling resistance of the tires may result from the locations inside the pressurized chamber where the tires are held.

Patent Document 1 discloses a structure of a special autoclave for reducing temperature differences therein. As equipment for realizing a uniform temperature distribution, an autoclave of double-layered structure is used to hold the objects to be molded in it, and the gas inside the autoclave is stirred and mixed by a plurality of auxiliary heat sources and stirring fans in positions corresponding to the auxiliary heat sources in the autoclave. Yet, this equipment is larger than most conventional autoclaves and requires a plurality of power sources, thus presenting a problem of extremely large energy loss.

Also, Patent Document 2 discloses an arrangement in which a plurality of duct valves to open and close the duct are provided and turbulence is caused inside the autoclave by opening and closing the duct valves. However, this arrangement requires a drive source or a control system for the opening and closing of the duct valves additionally. Thus the problem of large equipment and increased energy loss persists unsolved.

The present invention has been made to solve the above-described problems, and an object thereof is to provide an autoclave capable of creating a uniform temperature distribution inside the pressurized chamber while avoiding enlarged equipment scale and increased energy loss and a tire manufacturing method using the autoclave.

Means for Solving the Problem

To solve the above-described problems, an arrangement of the invention is such that the autoclave includes a pressurized chamber of a cylindrical shape, a heat source and a fan, both disposed within the pressurized chamber at one end thereof, and a duct extending lengthwise on the inner peripheral wall surface of the pressurized chamber to discharge the air sent by the fan at the other end thereof. In this arrangement, the air outlet of the duct discharges the air sent by the fan in a circumferential direction of the pressurized chamber.

According to this arrangement, the air heated by a heat source disposed at one end side of the pressurized chamber and sent through a plurality of ducts to the other end side thereof is discharged from the air outlets of the ducts in a circumferential direction of the pressurized chamber. As a result, the air flowing from one end side to the other end side turns into whirling flows rotating circumferentially in the pressurized chamber. This causes forced convections in the entire interior of the pressurized chamber, eliminating stagnations of airflow therein. Consequently, the air heated by the heat source reaches all parts within the pressurized chamber and thus realizes a uniform temperature distribution therein. Hence, the autoclave according to the present invention can cure the tires uniformly irrespective of their positions within the pressurized chamber.

Another arrangement of the autoclave is such that the air outlet of the duct is equipped with a plate extending in a circumferential direction of the pressurized chamber.

According to this arrangement, the air exiting from the air outlet is discharged along the plate inclined in a circumferential direction of the pressurized chamber. Hence, in addition to the advantages described already, this simple arrangement makes it possible to create whirling flows inside the pressurized chamber.

Also, another arrangement of the autoclave is such that a plurality of ducts are disposed at circumferentially equal intervals on the inner peripheral wall surface of the pressurized chamber and the plates of the air outlets are so arranged to extend in the same circumferential direction.

According to this arrangement, the plates in the air outlets of the plurality of ducts disposed at circumferentially equal intervals on the inner peripheral wall surface of the pressurized chamber extend in the same circumferential direction. Therefore, in addition to the advantages described already, this arrangement allows the air discharged along the plates in the air outlets to create whirling flows inside the pressurized chamber easily. At the same time, the discharged air causes the whirling currents to flow at uniform speed along the inner peripheral wall surface, thus creating an even more uniform temperature distribution inside the pressurized chamber.

Also, another arrangement of the autoclave is such that a plurality of plates are provided in each of the air outlets of the ducts and the plurality of plates are set at different angles from each other in the same circumferential direction of the pressurized chamber.

According to this arrangement, the air heated by the heat source is sent into the openable end side of the pressurized chamber by the fan and the plurality of ducts. There the air is discharged in a circumferential direction of the pressurized chamber by the plurality of plates provided in each of the air outlets of the ducts. Thus the air flowing from one end side to the other end side turns into whirling flows rotating circumferentially in the pressurized chamber. This causes forced convections in the entire interior of the pressurized chamber, eliminating stagnations of airflow therein. Consequently, the air heated by the heat source reaches all parts within the pressurized chamber and thus realizes a uniform temperature distribution therein. Moreover, since the orientation of the plurality of plates causing air discharge at different angles in a circumferential direction can be controlled, the reach and direction of air currents discharged from the air outlets of the ducts can also be controlled. Hence it is possible to control the strength and size of whirling flows. And the whirling flows of controlled strength and size optimize the forced convections that occur in the entire interior of the pressurized chamber and eliminates stagnations of airflow inside the pressurized chamber. As a result, the air heated by the heat source reaches all parts within the pressurized chamber, thus realizing a uniform temperature distribution therein. Hence, the autoclave according to the present invention can cure the tires uniformly irrespective of their positions where they are held in the pressurized chamber. Note that the size of whirling flows meant herein is the breadth of each of spiral airflows inside the pressurized chamber.

Also, another arrangement of the autoclave is such that the plurality of plates are curved at different (radiuses of $r_1/r_2$) curvatures from one end side toward the other end side of the pressurized chamber, and the curvatures of the curved plates are incrementally larger from one circumferential end to the other circumferential end of each duct.

According to this arrangement, in addition to the features of the arrangements described already, a plurality of plates are curved in one direction from one end side toward the other end side within the ducts, and the angle of curvature is incrementally larger from one circumferential side to the other circumferential side of each duct. As a result, the air discharged in a circumferential direction of the pressurized chamber from the air outlet of each duct can be discharged wider than the opening size of the duct, thereby making the size of each whirling flow in the pressurized chamber larger. Hence, it is possible to cause forced convections in the entire interior of the pressurized chamber efficiently with wider whirling flows, eliminate stagnations of airflow in the pressurized chamber, and create a uniform temperature distribution inside the pressurized chamber.

Also, another arrangement of the autoclave is such that the plurality of plates are twisted at different angles toward the inner peripheral wall surface from one end side toward the other end side of the pressurized chamber, and the angles of twist are incrementally larger from one circumferential end to the other circumferential end of each duct.

According to this arrangement, in addition to the features of the arrangements described already, the plurality of plates are twisted toward the inner peripheral wall surface from the blocked end side toward the openable end side inside the ducts, and the angles of twist increase incrementally from one circumferential side to the other circumferential side of the ducts. As a result, the air discharged in a circumferential direction of the pressurized chamber from the air outlet of the duct is discharged in the circumferential direction while directed closer to the inner peripheral wall surface. And this makes the flow of air currents from the air outlets faster, thereby creating stronger whirling flows inside the pressurized chamber. Hence, it is possible to cause forced convections in the entire interior of the pressurized chamber with strong whirling flows. And this eliminates stagnations of airflow in the pressurized chamber and creates a uniform temperature distribution inside the pressurized chamber.

Also, another arrangement of the autoclave is such that the ducts are disposed diagonally opposite from each other on the inner peripheral wall surface of the pressurized chamber.

According to this arrangement, in addition to the features of the arrangements described already, the plates inside the air outlets of the ducts so disposed as to be diagonally opposite from each other on the inner peripheral wall surface of the pressurized chamber extend in the same circumferential direction. As a result, the air currents discharged from the air outlets of the ducts disposed diagonally opposite from each other easily turn into whirling flows occurring inside the pressurized chamber. And because the flow speed of the whirling flows can be made uniform circumferentially, the temperature distribution inside the pressurized chamber can be made even more uniform.

Also, another arrangement of the autoclave is such that the ducts are disposed at two positions on the inner peripheral wall surface of the pressurized chamber.

According to this arrangement, the ducts are disposed at two positions on the inner peripheral wall surface of the pressurized chamber. Hence, the manufacturing cost can be held low, and the whirling flows can be created inside the pressurized chamber with certainty.

Also, another arrangement of the autoclave is such that the ducts are disposed above a floor board placed inside the pressurized chamber.

According to this arrangement, it is no longer necessary to raise the durability of the floor board to protect the ducts installed under the floor board from the workers or carriages that pass thereon. This will help reduce the manufacturing cost. ?

Also, an embodiment regarding a method for manufacturing tires includes the steps of placing a plurality of tires side by side in the lengthwise direction inside a cylindrical pressurized chamber and sealing the pressurized chamber, operating a heat source and a fan disposed at one end side of the pressurized chamber interior and discharging air blown by the fan through a plurality of ducts from the other end side of the pressurized chamber, and curing a plurality of tires by discharging air currents from the air outlets of the plurality of ducts in the same circumferential direction of the pressurized chamber and creating whirling flows rotating circumferentially inside the pressurized chamber.

According to this embodiment, a plurality of tires are cured by the whirling flows of air rotating circumferentially in the pressurized chamber. As a result, the plurality of tires are subjected to a uniform thermal history, and thus tires featuring uniform performance irrespective of their positions inside the pressurized chamber can be obtained.

BRIEF DESCRIPTION OF THE DRAWINGS

FIG. 17 is an exploded perspective illustration and an axial cross section of a tire.

FIG. 18 is illustrations schematically showing airflow distributions and temperature distribution inside a conventional autoclave.

BEST MODE FOR CARRYING OUT THE INVENTION

First Embodiment

Figure 1:
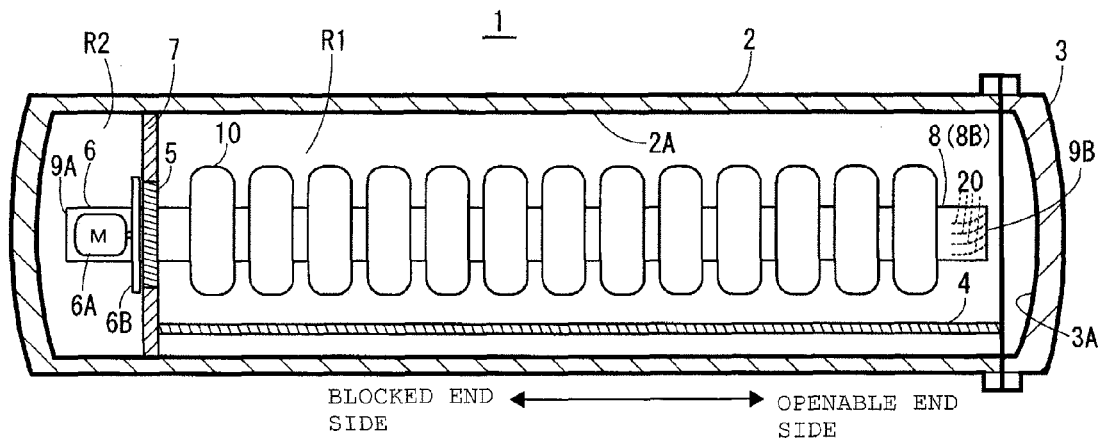
FIG. 1 is a schematic illustration of an autoclave in accordance with the present invention.

FIG. 1 is a schematic diagram showing an internal structure of an autoclave 1 according to the present invention.

The autoclave 1 in the figure includes a pressurized chamber 2, which is formed in a cylindrical shape blocked at one end thereof and can hold a plurality of tires 10 therein, and an airtight door 3, which is openably disposed at the other end of the pressurized chamber 2.

The pressurized chamber 2 has a peripheral wall lined with a not-shown heat insulating material or the like without gaps along the internal periphery and has inside a curing region R1 where a plurality of tires 10 are held for curing.

The airtight door 3 is a door openably provided at the open end of the pressurized chamber 2 and is formed concentrically with the cylindrical pressurized chamber 2. The airtight door 3 seals the opening of the pressurized chamber 2 via a not-shown sealing material provided along its periphery, thereby preventing the air supplied into the pressurized chamber 2 from leaking outside. That is, the pressurized chamber 2 having a blocked end remains an enclosed space after the airtight door 3 is closed. The back face 3A of the airtight door 3, which forms the enclosed space together with the pressurized chamber 2, is spherically recessed in the direction opposite from the enclosed space, and the center of the spherical surface thereof is concentric with the central axis of the pressurized chamber 2.

Placed in the lower half of the pressurized chamber 2 is a floor board 4 which extends in the lengthwise direction of the pressurized chamber 2. When introducing tires into the pressurized chamber 2, a plurality of tires are carried from the openable end side, where the airtight door 3 is located, toward the blocked end side on a carriage or the like that can run on the floor board 4. Then the plurality of tires 10 are hung one by one from the not-shown hooks provided in the pressurized chamber 2 such that they are arranged side by side in the lengthwise direction of the pressurized chamber 2.

A brief description is given here of tires 10 to be held within the autoclave 1 according to the present embodiment. FIG. 17 is an exploded perspective illustration and an exploded axial cross section of an uncured retread tire as an example of a tire 10 to be cured in the autoclave 1. As shown in the figure, the tire 10 is constructed of a base tire 11 serving as the base of the tire, a cushion rubber 12 to be bonded to the circumferential surface of the base tire 11, and a tread rubber 13 to be wrapped around the circumferential surface of the base tire 11 via the cushion rubber 12.

The base tire 11 is comprised of a pair of bead regions 11A consisting of members such as ring-shaped steel cords, side regions 11B extending toroidally astride the pair of bead regions 11A, and a crown region 11C. Layered radially in the crown region 11C are a plurality of belts. The base tire 11 can be produced by abrading (buffing) the tread region of a used tire or by curing a used tire in a mold having no profile thereon corresponding to the tread pattern, for instance. Note that the degree of curing of the base tire 11 may be a half-curing which is short of the degree of curing required of a product tire.

The cushion rubber 12 is an uncured rubber of approximately the same composition as those of the base tire 11 and the tread rubber 13. Cured in the autoclave 11, the cushion rubber 12 performs the function of a bonding layer by integrating the base tire 11 and the tread rubber 13 together. The tread rubber 13 comes in a strip shape whose length is equal to the circumferential length of the base tire 11. Cured in the state of being wrapped around the crown region 11C of the base tire 11, the tread rubber 13 serves as the tread member of a product tire. The tread rubber 13 in a strip is prepared as it is cured in a press-type curing unit with one of the molding dies having a profile corresponding to the desired tread pattern.

Also, the strip-shaped tread rubber 13 formed by the press-type curing unit is wound around the circumferential surface of the cushion rubber 12 on the base tire 11 and provisionally integrated with the base tire 11 as the ends of the tread rubber strip are joined with each other.

Note that the unit for molding the tread rubber 13 is not limited to the press-type unit. For example, a ring-shaped tread rubber 13 may be cure-molded in a mold dedicated to molding such a tread rubber. To fit the ring-shaped tread rubber 13 molded by the dedicated mold around the base tire 11, the tread rubber 13 is expanded wider by a not-shown diameter expansion unit before it is located around the base tire 11, and then the diameter of the tread rubber 13 is reduced to the original diameter. Also, the degree of curing of the tread rubber 13, as with that of the base tire 11, may be a half-curing which is short of the degree of curing required of a product tire.

The tire 10 of a structure as described above is placed in a bag called a curing envelope and hung inside a pressurized chamber 2. Since the pressure inside the envelope is reduced below atmospheric pressure, the inner surface of the envelope is in tight adherence to the outer surface of the tread rubber 13. That is, with the tire 10 placed inside the curing envelope, the tread rubber 13 remains pressed against the circumferential surface of the base tire 11.

Described above as examples of the tire 10 to be held inside the pressurized chamber 2 of the autoclave 1 are the cured base tire 11 and the retread tire fitted with cured tread rubber 13. However, it should be noted that the tire 10 to be held inside the autoclave 1 is not limited to those of the above-described structures, but may be any tire which undergoes a curing process in the molding process.

Referring back to FIG. 1, a description is given of the structure of the pressurized chamber 2 again.

Formed on the blocked end side, which is one end side of the pressurized chamber 2, is an air supply region R2. The air supply region R2 is a region formed by a bulkhead 7 which partitions off a curing region R1. Installed within the air supply region R2 are a heat source 5 and a fan 6 which perform the heating and circulation of air inside the curing region R1.

The heat source 5 is located in the center of the bulkhead 7. The heat source 5 is, for instance, a heater that can be heated electrically. The heating up to a predetermined temperature therefore is done by controlling the electrical power supplied to the heater.

The fan 6, which is located on the blocked end side of the heat source 5, consists of a motor 6A and rotor blades 6B which are rotated by the motor 6A. The fan 6 operates in such a manner that the rotation of the rotor blades 6B driven by the motor 6A causes the intake of air from the curing region R1 into the air supply region R2 and simultaneously causes the heating of the air by the heat source 5. At the same time, the fan 6 compresses the air inside the air supply region R2 and sends the air into the air inlets 9A of the ducts 8 which open onto the airtight door 3 side.

In other words, the arrangement is such that the drive of the fan 6 causes the air flowing from the curing region R1 into the air supply region R2 to be heated by the heat source 5 and at the same time raises the air pressure inside the air supply region R2, thereby sending the air into the air inlets 9A of a plurality of ducts 8 provided in the air supply region R2 and discharging the heated air from the air outlets 9B of the ducts 8 opening on the airtight door 3 side.

Figure 2:
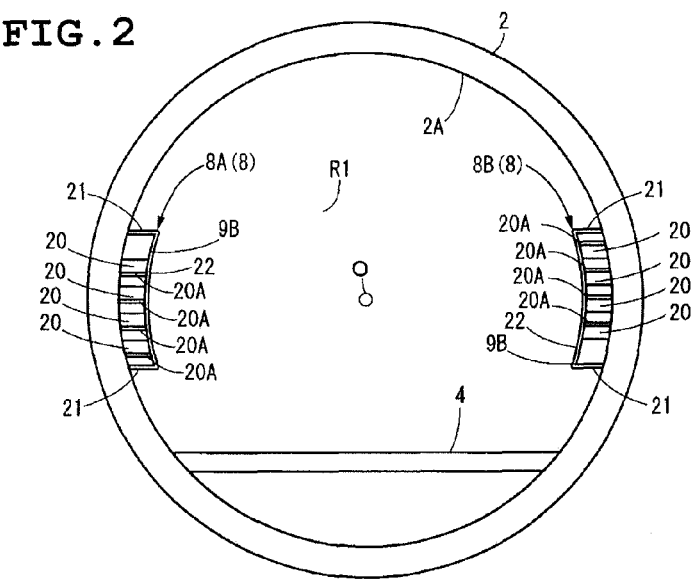
FIG. 2 is a front view showing a plurality of ducts (first embodiment).

As shown in FIG. 1, the duct 8 is a tubing extending from the air supply region R2 to the airtight door 3 side through the curing region R1 lengthwise along the inner peripheral wall surface 2A of the pressurized chamber 2. Also, as shown in a front view of FIG. 2, the ducts 8 according to this embodiment are provided in two positions (hereinafter referred to as ducts 8A and 8B) on the inner peripheral wall surface 2A of the pressurized chamber 2. One duct 8A and the other duct 8B are disposed opposite from each other at equal circumferential intervals on the inner peripheral wall surface 2A of the pressurized chamber 2. In the present embodiment, as shown in FIG. 2, one duct 8A and the other duct 8B are disposed horizontally opposite to each other at equal circumferential intervals on the inner peripheral wall surface 2A of the pressurized chamber 2 such that the horizontal plane passing through the autoclave center O passes through the centers of the ducts 8A and 8B. It is to be noted that the ducts 8A and 8B are of the same dimensions.

The ducts 8A and 8B are each a rectangular-sectioned tubing which extends lengthwise along the pressurized chamber 2. The ducts 8A and 8B have each an air outlet 9B opening on the airtight door 3 side to discharge the air heated by the heat source 5.

That is, the air heated and sent by the heat source 5 and the fan 6 located on the blocked end side, which is one end side of the pressurized chamber 2, is sent through the ducts 8A and 8B, and discharged toward the airtight door 3 located on the openable end side, which is the other end side of the pressurized chamber 2.

Figure 3:
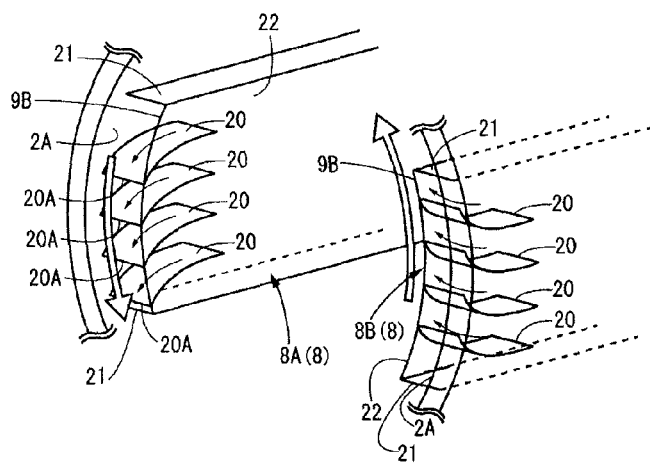
FIG. 3 is an enlarged perspective illustration showing the air outlets of ducts (first embodiment).

FIG. 3 is an enlarged perspective illustration showing a neighborhood of the air outlets 9B of the ducts 8A and 8B which discharge the air toward the airtight door 3.

As shown in the figure, the ducts 8A and 8B are each a tubing enclosed by a pair of plate pieces 21, 21 rising on both sides from the inner peripheral wall surface 2A of the pressurized chamber 2 and an air conduit plate 22 which connects with (bridges) the pair of plate pieces 21, 21 on the top side opposite from the inner peripheral wall surface 2A of the pressurized chamber 2.

The separation N between the pair of plate pieces 21, 21 is to be set smaller than 25 percent of the circumferential length M of the inner peripheral wall surface 2A. Preferably the separation N between the plate pieces 21, 21 is set within a range of 15 to 20 percent of the circumferential length M of the inner peripheral wall surface 2A.

The air conduit plate 22, curved in the same way as the inner peripheral wall surface 2A of the pressurized chamber 2, for instance, connects with the plate pieces 21, 21. Note that when the tires 10 to be cured in the autoclave 1 are all of the same diameter, the air conduit plate 22 may be formed with a curvature corresponding to that of the outer periphery of the tires 10. However, the distance between the air conduit plate 22 and the outer periphery of tires, when it is less than a certain allowable distance, may obstruct the flow of the air discharged at the openable end side and flowing toward the blocked end side, thus resulting in a failure in uniformly curing the tires. Therefore, it is preferable that the width (height) of the plate pieces 21, 21 is so adjusted to keep the distance S between the air conduit plate 22 and the outer periphery of the tires more than the certain allowable distance.

Provided in the air outlets 9B of the ducts 8A and 8B terminating at the openable end side are a plurality of discharge plates 20. The discharge plates 20, which are each a plate member extending in the lengthwise direction along the duct 8A or 8B, are placed inside the ducts 8A and 8B.

More specifically, the discharge plates 20 are each secured between the inner peripheral wall surface 2A of the pressurized chamber 2 and the air conduit plate 22 of the duct 8 by a not-shown fastening means or welding. Also, the discharge plates 20 are curved in one circumferential direction of the inner peripheral wall surface 2A, as shown by arrows, from inside the duct 8A or 8B toward the air outlet 9B thereof, and the front ends 20A of the discharge plates 20 terminate nearly at the same position as the air outlets 93 of the ducts 8A and 8B.

The length of the discharge plates 20 from the rear end to the front end 20A is set at 10 to 30 cm. The choice of 10 to 30 cm for the length of the discharge plates 20 not only accomplishes a necessary and sufficient effect, but also can eliminate the problem of limited space for installing the discharge plates 20 inside the ducts 8A and 8B and the trouble of installing them. Also, the discharge plates 20 are disposed, for instance, at circumferential intervals of 10 to 30 cm along the inner peripheral wall surface 2A inside each of the ducts 8A and 8B. Thus the plurality of discharge plates 20 disposed within each of the ducts 8A and 8B can create a swirling flow of air inside the pressurized chamber more efficiently.

With the discharge plates 20 curved in one circumferential direction of the inner peripheral wall surface 2A disposed in the air outlets 9B of the ducts 8A and 8B, the currents of air blown out of the air outlets 9B flow along the curves of the discharge plates 20. More specifically, as shown by the arrows in FIG. 3, heated air is discharged from the air outlets 9B of the ducts 8A and 8B in the same circumferential direction which is a direction along the inner peripheral wall surface 2A. In this manner, the discharge plates 20 extending in the same circumferential direction of the inner peripheral wall surface 2A are provided in the air outlets 9B of a plurality of dusts 8A, 8B placed on the inner peripheral wall surface 2A. And heated air is discharged from the air outlets 9B in the same circumferential direction along the inner peripheral wall surface 2A, thereby creating swirling flows inside the pressurized chamber 2.

Figure 4:
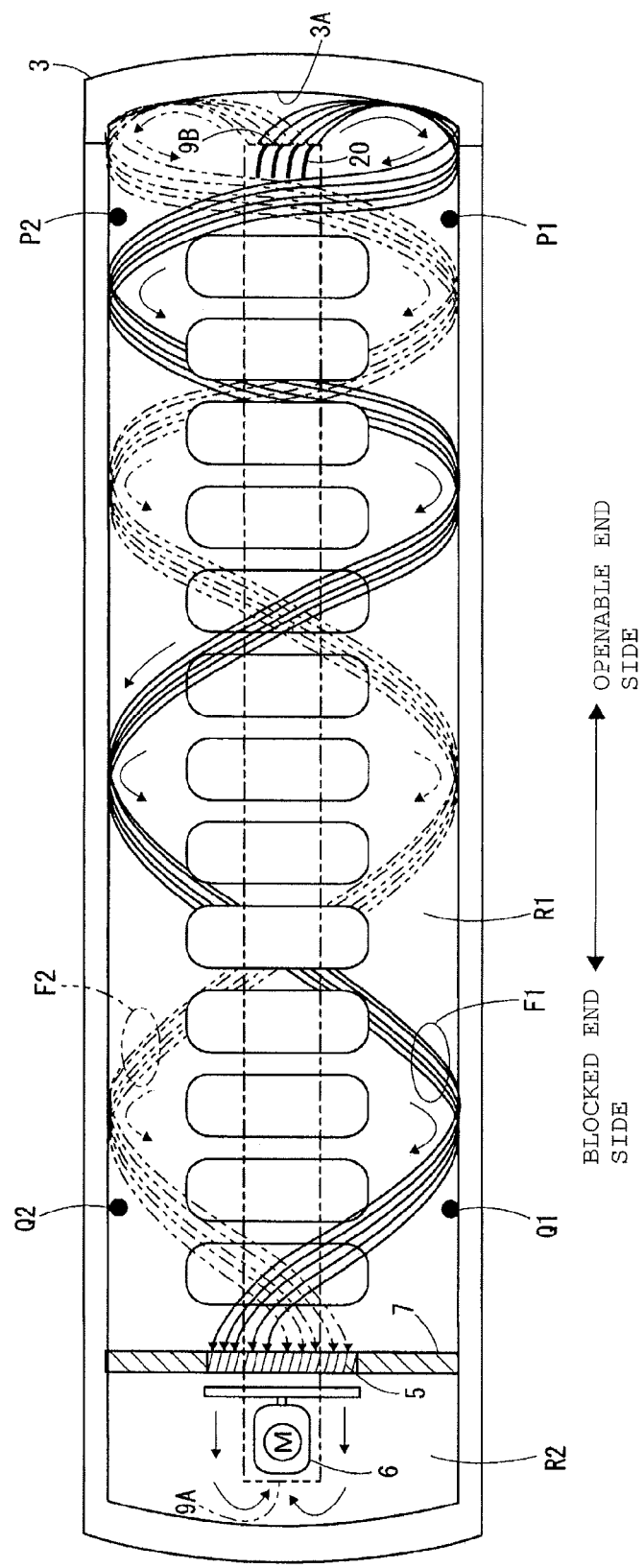
FIG. 4 is an illustration schematically showing the swirling flows of air inside the pressurized chamber (first embodiment). ?

FIG. 4 is an illustration schematically showing the swirling flows of air created inside the pressurized chamber 2.

As shown in the figure, each of the air currents discharged along the inner peripheral wall surface 2A after passing through the discharge plates 20 in the ducts 8A and 8B runs into the airtight door 3 and then flows circumferentially along the back face 3A of the airtight door 3 which forms the curing region R1. This creates rotating currents along the inner peripheral wall surface 2A. Then the rotating currents of air flow spirally circling along the inner peripheral wall surface 2A from the airtight door 3 side to the blocked end side. Thus the air currents become swirling flows inside the pressurized chamber 2 and are taken into the air supply region R2 after passing through the heat source 5 provided in the bulkhead 7. More specifically, the air discharged from the discharge plates 20 of the duct 8A flows downward along the inner peripheral wall surface 2A to become a swirling flow F1, which is one of the swirling flows shown in FIG. 4. And the air discharged from the discharge plates 20 of the duct 8B flows upward along the inner peripheral wall surface 2A to become a swirling flow F2, which is the other of the swirling flows shown in FIG. 4. Since the ducts 8A and 8B are disposed exactly opposite from each other, the swirling flow F2 becomes a swirling flow exactly a half cycle out of step with the swirling flow F1.

Figure 5A:
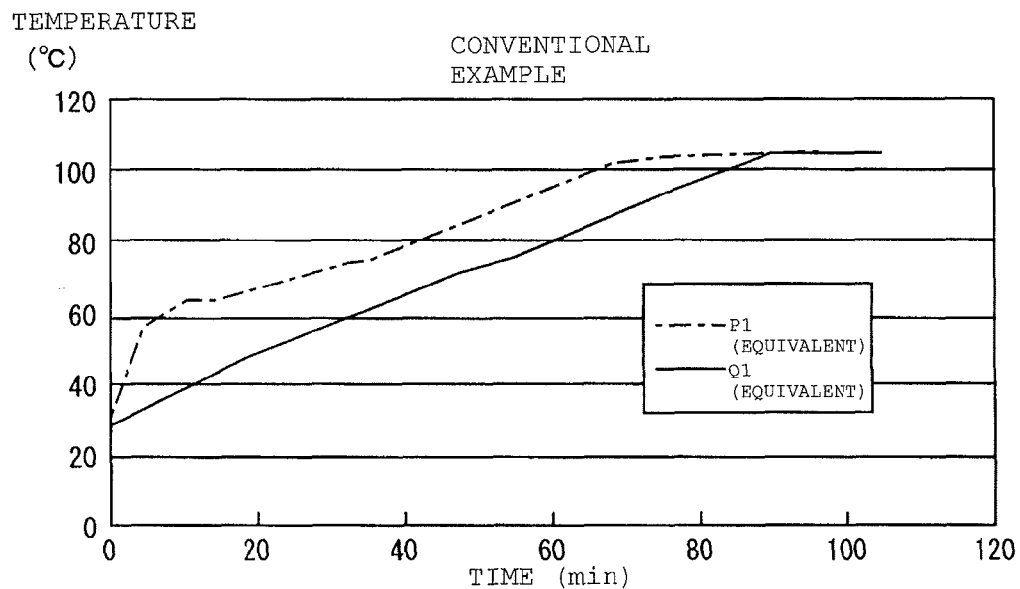
FIG. 5 is graphs showing the changes in temperature in a conventional autoclave and in an autoclave according to the present invention (first embodiment).
Figure 5B:
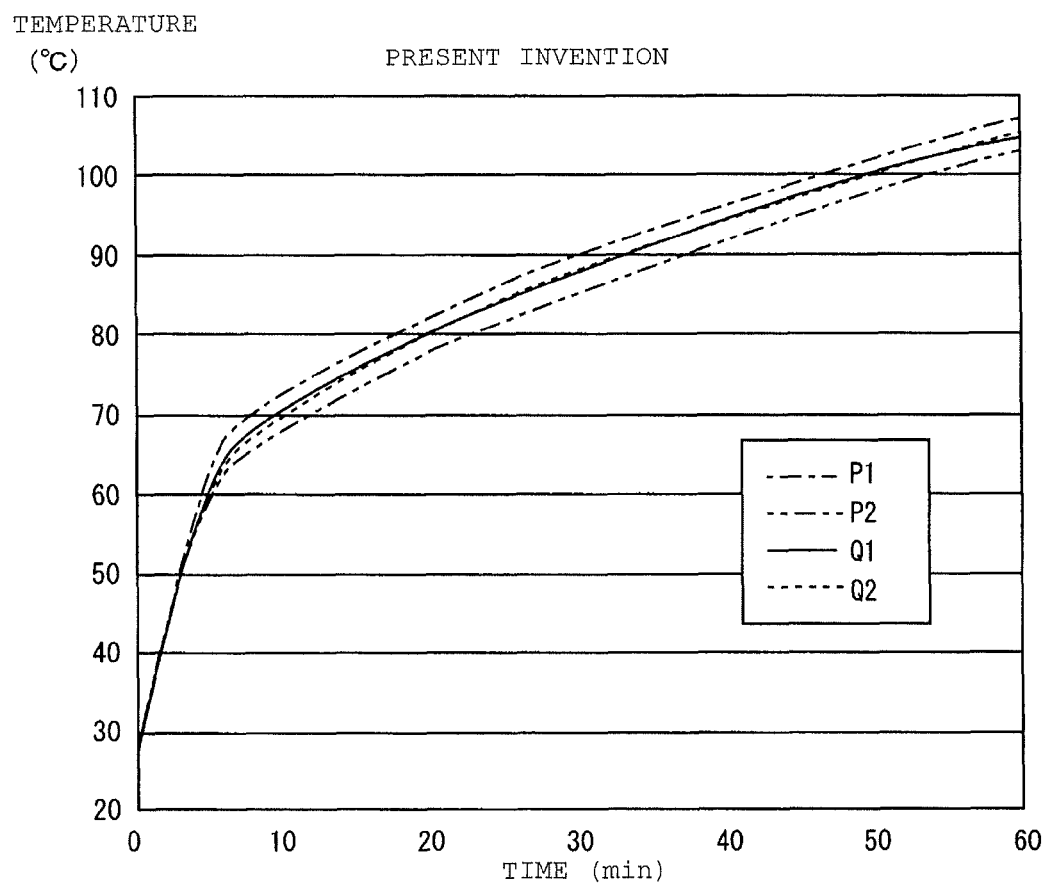

FIG. 5A shows a graph of the changes in temperature in a conventional autoclave, and FIG. 5B a graph of the changes in temperature in an autoclave 1 according to the present invention. To be more specific, FIG. 5A is a graph showing the changes with time of the temperatures at lower positions on the airtight door 3 side and the air supply region R2 side inside the curing region (positions corresponding to P1 and Q1 in FIG. 4) of a conventional autoclave. And FIG. 53 is a graph showing the changes with time of the temperatures at the same positions P1 and Q1 as in FIG. 5A and the temperatures at upper positions P2 and Q2 (see FIG. 4) opposite from the positions P1 and Q1.

In the conventional autoclave, as shown in FIG. 5A, the temperature at the lower position P1 on the airtight door 3 side rises more quickly than the temperature at the lower position Q1 on the air supply region side, and the heating inside the autoclave continues with a difference of about 20° C. until the temperatures reach an equilibrium. And there is a time lag of about 20 minutes between the temperatures at positions P1 and Q1 before reaching their maximum temperature.

On the other hand, with an autoclave 1 according to the present embodiment, the temperatures at the upper and lower positions P1 and P2 on the airtight door 3 side and the temperatures at the upper and lower positions Q1 and Q2 on the air supply region R2 side rise at nearly the same gradient up to the neighborhood of 60° C. as shown in FIG. 5B. Then there result some differences between the temperatures at the positions P1 and P2 on the airtight door 3 side and the temperatures at the positions Q1 and Q2 on the air supply region R2 side, but still these temperatures keep rising at similar gradients. The differences between the temperatures at the positions P1 and P2 on the airtight door 3 side and the temperatures at the positions Q1 and Q2 on the air supply region R2 side are about 5° C., which is far smaller than those that occur in the conventional autoclave. In other words, the autoclave 1 of the present invention can raise the temperatures in the pressurized chamber 2 in a substantially uniform manner by creating swirling flows inside the curing region R1 and circulating heated air by the fan 6.

Accordingly, the autoclave 1 of the present invention realizes almost uniform temperature rise in all lengthwise positions inside the pressurized chamber 2. Therefore, a plurality of tires 10 held side by side along the lengthwise direction of the pressurized chamber 2 can be cured with a uniform temperature rise irrespective of the positions where they are held therein. Moreover, the temperature rise occurs uniformly in the upper and lower parts of the pressurized chamber 2 such that the individual tires are heated uniformly along their circumference with a uniform temperature rise. Thus, the tires can be cured uniformly in their entirety.

Second Embodiment

In the first embodiment, the plurality of discharge plates 20 are all constructed in the same shape. A second embodiment of the invention differs from the first embodiment in that the ducts 8A and 8B are of different shape and that the plurality of discharge plates 31 to 35 are curved at different curvatures from each other.

Figure 6:
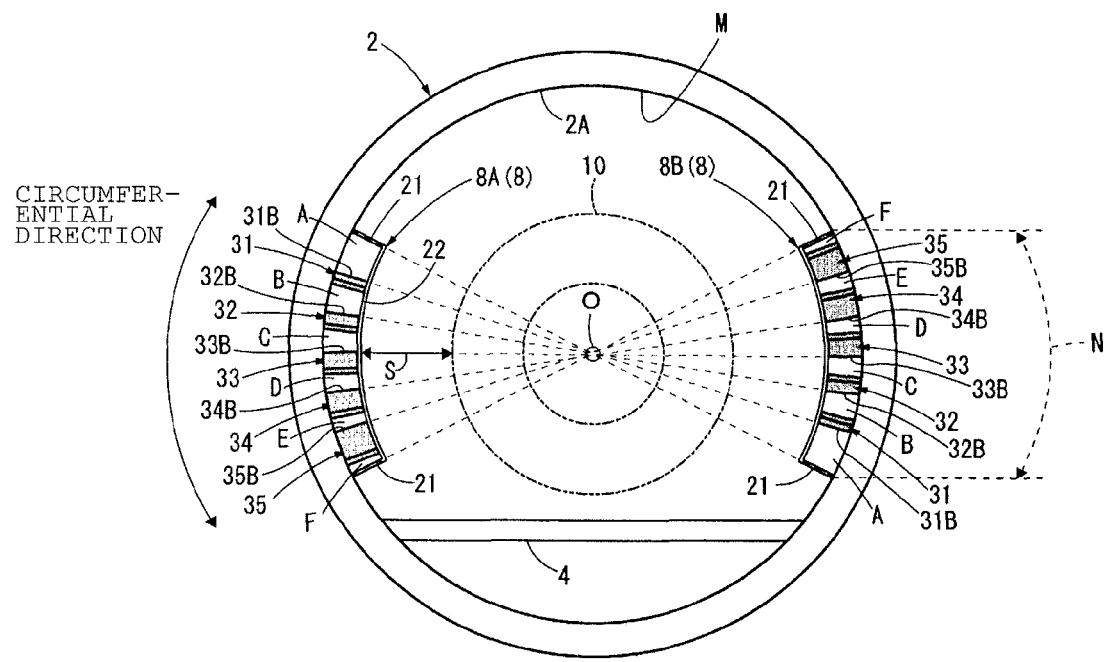
FIG. 6 is a front view showing a plurality of ducts (second embodiment).
Figure 7:
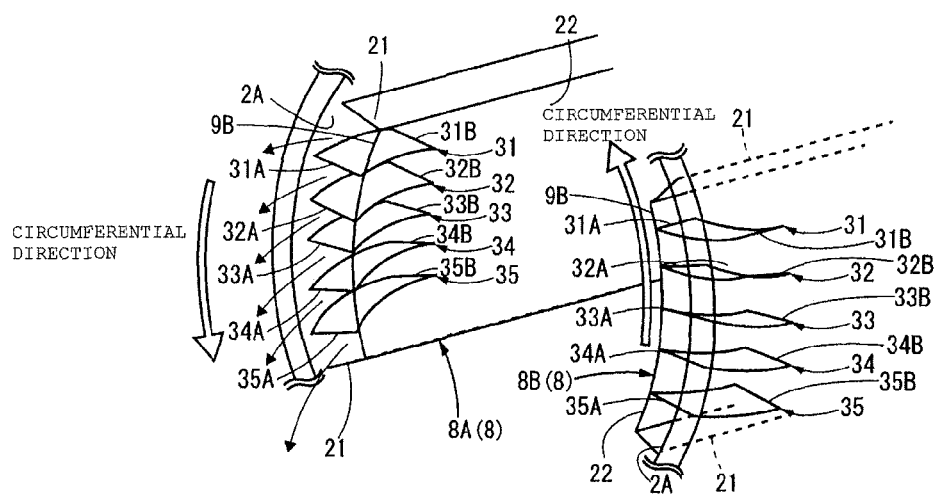
FIG. 7 is an enlarged perspective illustration showing the air outlets of ducts (second embodiment).

FIG. 6 is a front view of the ducts 8A and 8B provided with the plurality of discharge plates 31 to 35 according to the second embodiment. FIG. 7 is an enlarged perspective illustration showing a neighborhood of the air outlets 9B of the ducts 8A and 8B which discharge the air toward the airtight door 3.

Hereinbelow, a description is given with reference to FIG. 6 and FIG. 7. Note that the identical components to those of the first embodiment are given the identical reference numerals, and the repeated description thereof will be omitted.

As, shown in FIG. 6, the ducts 8A and 8B are each a tubing enclosed by a pair of plate pieces 21, 21 rising on both sides from the inner peripheral wall surface 2A of the pressurized chamber 2 and an air conduit plate 22 which connects with (bridges) the pair of plate pieces 21, 21 on the top side opposite from the inner peripheral wall surface 2A of the pressurized chamber 2.

The plate pieces 21, 21 are set apart by a predetermined distance from each other, extending by the same width toward the autoclave center O from the inner peripheral wall surface 2A of the pressurized chamber 2. In the same way as in the first embodiment, the separation between the pair of plate pieces 21, 21 is to be set smaller than 25 percent of the circumferential length of the inner peripheral wall surface 2A. ?? Preferably the separation N between the plate pieces 21, 21 is set within a range of 15 to 20 percent of the circumferential length of the inner peripheral wall surface 2A.

It is to be noted that, although the plate pieces 21, 21 are described above to extend toward the autoclave center O, they may be disposed to extend horizontally from the inner peripheral wall surface 2A as in the first embodiment.

The air conduit plate 22 connects with the plate pieces 21, 21 and is curved in the same way as the inner peripheral wall surface 2A of the pressurized chamber 2.

Provided in the air outlets 9B of the ducts 8A and 8B, are a plurality of discharge plates in a circumferential direction of the inner peripheral wall surface 2A. The present embodiment will be described assuming that there are five discharge plates 31 to 35 provided in each of the ducts 8A and 8B. Note that the number of discharge plates is not limited to five as mentioned above, but may be any that can be set as appropriate.

Figure 8A:
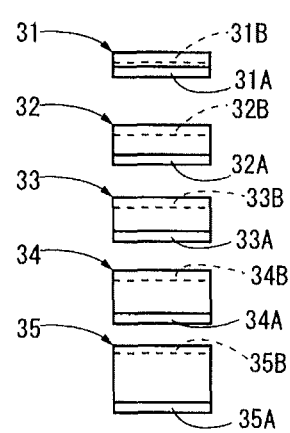
FIG. 8 is a front view and a side view of discharge plates (second embodiment).
Figure 8B:
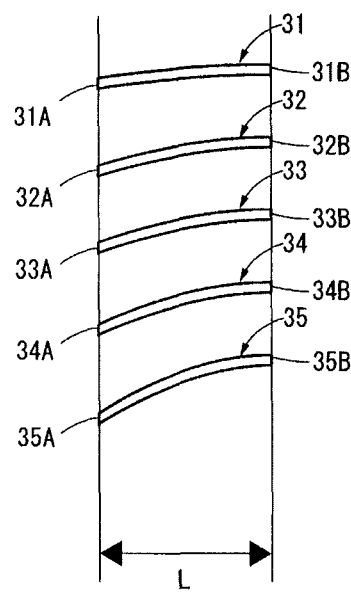

FIG. 8A is a front view of the discharge plates 31 to 35, and FIG. 8B a side view of the discharge plates 31 to 35.

The discharge plates 31 to 35 are plates formed in predetermined shapes which differ one to the other. More specifically, the discharge plates 31 to 35 are curved at different curvatures in one extending direction. For example, the curvature of the discharge plate 31 is the smallest, the curvature of the discharge plate 32 the second smallest, the curvature of the discharge plate 33 the third smallest, the curvature of the discharge plate 34 the fourth smallest, and the curvature of the discharge plate 35 the fifth smallest. In other words, the discharge plate 31, the discharge plate 32, the discharge plate 33, the discharge plate 34, and the discharge plate 35 have their curvatures increasing in this order.

The lengths of the discharge plates 31 to 35 are set such that the straight line length L from the rear ends 31B to 35B to the front ends 31A to 35A is 10 to 30 cm (see FIG. 8). The choice of 10 to 30 cm for the length of the discharge plates 31 to 35 not only accomplishes a necessary and sufficient effect, but also can eliminate the problem of limited space for installing the discharge plates 31 to 35 inside the ducts 8A and 8B and the trouble of installing them.

It is to be noted that the curves of the discharge plates 31 to 35 may be formed with the same radius of curvature from the rear ends 31B to 35B to the front ends 31A to 35A or with a local curve midway between the rear ends 31B to 35B to the front ends 31A to 35A.

Referring back to FIG. 6 and FIG. 7, a description is given of the discharge plates 31 to 35.

The discharge plates 31 to 35 in each of the ducts 8A and 8B are secured between the inner peripheral wall surface 2A of the pressurized chamber 2 and the air conduit plate 22 of the duct 8 by a not-shown fastening means or welding. And the front ends 31A to 35A thereof terminate nearly at the same position as the air outlet 9B of the ducts 8A and 8B.

The discharge plates 31 to 35 in each of the ducts 8A and 8B are disposed at predetermined intervals along the circumference thereof. For example, the discharge plates 31 to 35 are placed such that the rear ends 31B to 35B thereof are located at equal intervals circumferentially in positions corresponding to the virtual lines radiating from the autoclave center O Also, the discharge plates 31 to 35 in each of the ducts 8A and 8B are preferably disposed at intervals of about 10 to 30 cm circumferentially along the inner peripheral wall surface 2A. The arrangement of the discharge plates 31 to 35 as described above can produce whirling flows inside the pressurized chamber more efficiently.

In each of the ducts 8A and 8B, the discharge plates 31 to 35 are curved in the same circumferential direction, and the curvature of the curves increases from one end to the other end in the circumferential direction of the ducts 8A and 8B.

To be more specific, in the duct 8A, which is one of the ducts, the discharge plates 31 to 35 are provided in such a manner that they are curved downward. The discharge plate 31 with the smallest curvature is disposed in the topmost position. And disposed below it are the discharge plate 32, the discharge plate 33, the discharge plate 34, and the discharge plate 35 downward in the order of incrementally larger curvature. In the duct 8B, which is the other of the ducts, the discharge plates 31 to 35 are provided in such a manner that they are curved upward. The discharge plate 31 with the smallest curvature is disposed in the bottommost position. And disposed above it are the discharge plate 32, the discharge plate 33, the discharge plate 34, and the discharge plate 35 upward in the order of incrementally larger curvature.

Thus, the ducts 8A and 8B of the same shape are disposed in positions opposite to each other across the autoclave center O, with the discharge plates 31 to 35 therein curved in the same circumferential direction. In other words, the discharge plates 31 to 35 provided in the duct 8A will be in the same positions as those in the duct 8B if they are turned 180 degrees around the autoclave center O.

With the discharge plates 31 to 35 disposed within the ducts 8A and 8B, partial ducts A to F, which are the sections defined by the discharge plates 31 to 35, are formed in the air outlets 9B.

Inside the duct 8A, the partial duct A is formed by the discharge plate 31, the inner peripheral wall surface 2A, the plate piece 21, and the air conduit plate 22. The partial duct B is formed by the discharge plate 31, the discharge plate 32, the inner peripheral wall surface 2A, and the air conduit plate 22. The partial duct C is formed by the discharge plate 32, the discharge plate 33, the inner peripheral wall surface 2A, and the air conduit plate 22. The partial duct D is formed by the discharge plate 33, the discharge plate 34, the inner peripheral wall surface 2A, and the air conduit plate 22. The partial duct E is formed by the discharge plate 34, the discharge plate 35, the inner peripheral wall surface 2A, and the air conduit plate 22. And the partial duct F is formed by the discharge plate 35, the plate piece 21, the inner peripheral wall surface 2A, and the air conduit plate 22.

Also, inside the duct 8A, the partial duct A is formed by the discharge plate 31, the inner peripheral wall surface 2A, the plate piece 21, and the air conduit plate 22. The partial duct B is formed by the discharge plate 31, the discharge plate 32, the inner peripheral wall surface 2A, and the air conduit plate 22. The partial duct C is formed by the discharge plate 32, the discharge plate 33, the inner peripheral wall surface 2A, and the air conduit plate 22. The partial duct D is formed by the discharge plate 33, the discharge plate 34, the inner peripheral wall surface 2A, and the air conduit plate 22. The partial duct E is formed by the discharge plate 34, the discharge plate 35, the inner peripheral wall surface 2A, and the air conduit plate 22. And the partial duct F is formed by the discharge plate 35, the plate piece 21, the inner peripheral wall surface 2A, and the air conduit plate 22.

Figure 9A:
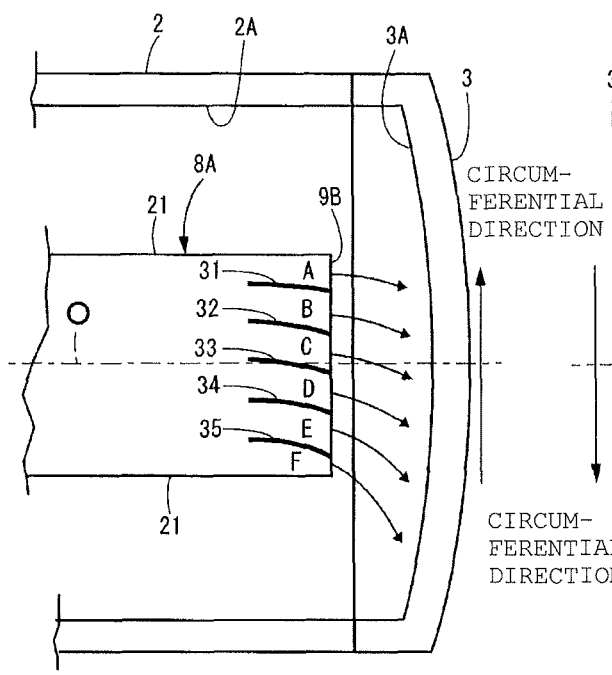
FIG. 9 is diagrams showing the directions of air discharged from partial ducts (second embodiment).
Figure 9B:
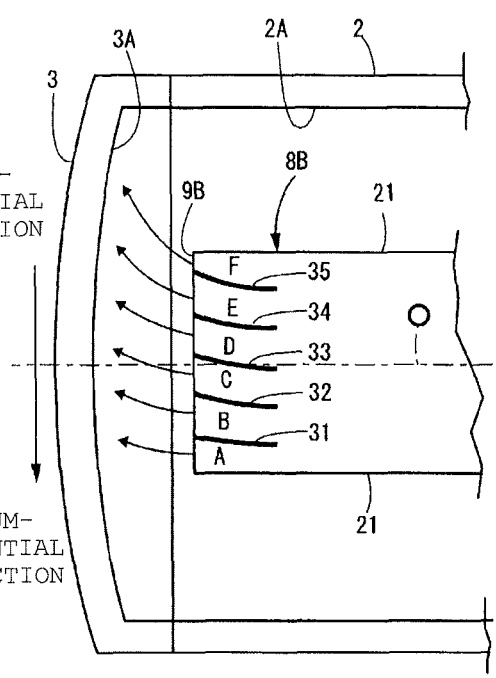

FIG. 9A is a diagram showing the directions of air discharged from the partial ducts A to F formed in the duct 8A. FIG. 9B is a diagram showing the directions of air discharged from the partial ducts A to F formed in the duct 8B.

As shown in FIG. 9A, the air discharged from the partial duct A in the duct 8A is discharged slightly downward relative to the extension direction of the duct 8A along the inner peripheral wall surface 2A. The air discharged from the partial duct B is discharged slightly more downward than the air discharged from the partial duct A along the inner peripheral wall surface 2A. The air discharged from the partial duct C is discharged slightly more downward than the air discharged from the partial duct B along the inner peripheral wall surface 2A. The air discharged from the partial duct D is discharged slightly more downward than the air discharged from the partial duct C along the inner peripheral wall surface 2A. The air discharged from the partial duct E is discharged slightly more downward than the air discharged from the partial duct D along the inner peripheral wall surface 2A. And the air discharged from the partial duct F is discharged slightly more downward than the air discharged from the partial duct E along the inner peripheral wall surface 2A. In other words, because of the partial ducts A to F, the air having passed through the duct 8A, is discharged at different angles in the same circumferential direction along the inner peripheral wall surface 2A different from the extension direction of the duct 8A.

Also, As shown in FIG. 9B, the air discharged from the partial duct A in the duct 8B is discharged slightly upward relative to the extension direction of the duct 8B along the inner peripheral wall surface 2A. The air discharged from the partial duct B is discharged slightly more upward than the air discharged from the partial duct A along the inner peripheral wall surface 2A. The air discharged from the partial duct C is discharged slightly more upward than the air discharged from the partial duct B along the inner peripheral wall surface 2A. The air discharged from the partial duct D is discharged slightly more upward than the air discharged from the partial duct C along the inner peripheral wall surface 2A. The air discharged from the partial duct E is discharged slightly more upward than the air discharged from the partial duct D along the inner peripheral wall surface 2A. And the air discharged from the partial duct F is discharged slightly more upward than the air discharged from the partial duct E along the inner peripheral wall surface 2A. In other words, because of the partial ducts A to F, the air having passed through the duct 8B, is discharged at different angles in the same circumferential direction along the inner peripheral wall surface 2A different from the extension direction of the duct 8B.

Accordingly, the flows of air discharged from the partial ducts A to F formed inside the duct 8A and the duct 8B become the flows in one direction around the autoclave center O.

Figure 10:
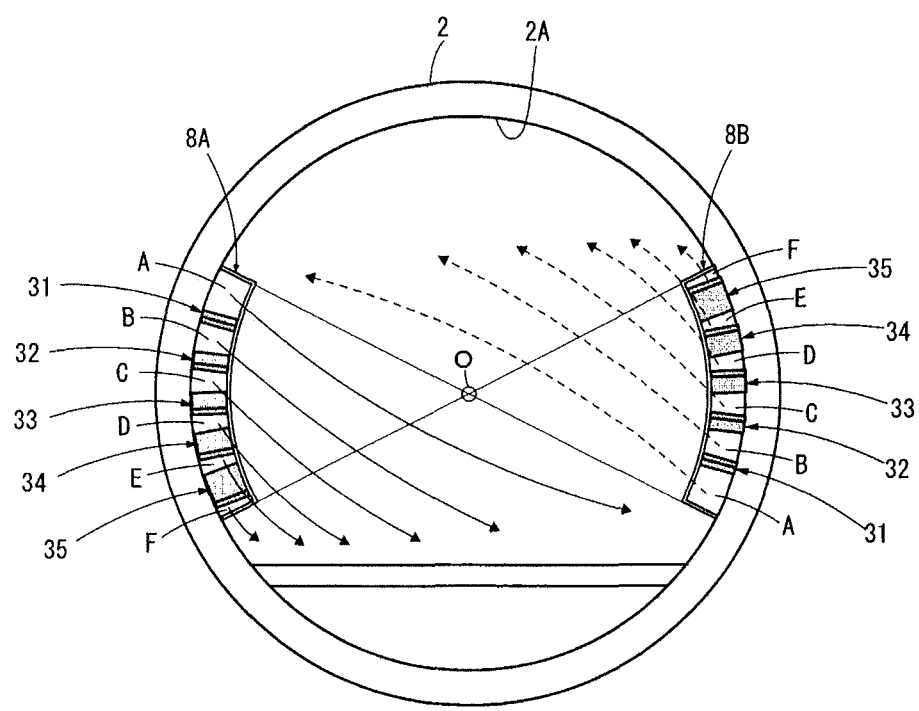
FIG. 10 is a diagram showing the airflows after the air discharged from the ducts runs into the lid member (second embodiment). ?

FIG. 10 is a diagram showing the air flows when the air discharged from the duct 8A and the duct 8B runs into the back face 3A of the airtight door 3. In the figure, the arrowed solid lines represent the flows of air discharged from the duct 8A, whereas the arrowed broken lines represent the flows of air discharged from the duct 8B.

As shown in FIG. 10, the air flows discharged in different directions by the discharge plates 31 to 35 in the ducts 8A and 8B run into the back face 3A of the airtight door 3 and then flow passing over the back face 3A in their respective directions. To be more specific, the air discharged from the partial duct A in the duct 8A flows slightly below the center of the airtight door 3 across the back face 3A of the airtight door 3. The air discharged from the partial duct B flows slightly below the flow of air discharged from the partial duct A across the back face 3A. The air discharged from the partial duct C flows slightly below the flow of air discharged from the partial duct B across the back face 3A. The air discharged from the partial duct D flows slightly below the flow of air discharged from the partial duct C across the back face 3A. The air discharged from the partial duct E flows slightly below the flow of air discharged from the partial duct D across the back face 3A. And the air discharged from the partial duct F flows slightly below the flow of air discharged from the partial duct E across the back face 3A.

Also, the air discharged from the duct 8B flows slightly above the center of the airtight door 3 across the back face 3A of the airtight door 3, in the direction opposite to the air discharged from the duct 8A. The air discharged from the partial duct A flows slightly above the center of the back face 3A. The air discharged from the partial duct B flows slightly above the flow of air discharged from the partial duct A across the back face 3A. The air discharged from the partial duct C flows slightly above the flow of air discharged from the partial duct B across the back face 3A. The air discharged from the partial duct D flows slightly above the flow of air discharged from the partial duct C across the back face 3A. The air discharged from the partial duct E flows slightly above the flow of air discharged from the partial duct D across the back face 3A. And the air discharged from the partial duct F flows slightly above the flow of air discharged from the partial duct E across the back face 3A.

That is, with the air from the duct 8B discharged in the direction opposite to that of the air discharged from the duct 8A, the air discharged from the duct 8A and the duct 8B will flow in the same circumferential direction along the inner peripheral wall surface of the pressurized chamber 2. Hence, the air discharged from the duct 8A and the duct 8B will first run into the back face 3A of the airtight door 3, then flow across the back face 3A, and finally flow in the form of swirling flows F1 and F2 inside the pressurized chamber 2 from the openable end side to the blocked end side (see FIG. 11).

As described above, the ducts 8A and 8B are disposed at horizontally opposite positions on the inner peripheral wall surface of the pressurized chamber. And in each of the ducts 8A and 8B, the discharge plates 31 to 35 are curved at different angles in the same circumferential direction. At the same time, in each of the ducts 8A and 8B, the curvature of the discharge plates 31 to 35 increases incrementally in one direction. As a result, the air blown out of the air outlets 9B of the ducts 8A and 8B flows as shown in FIG. 9 and FIG. 10, thus creating swirling flows F1 and F2 that reach the entire region within the pressurized chamber 2. Also, the length (width) X of the ducts 8A and 8B along the circumference is set at 25% or less of the circumferential length L of the inner peripheral wall surface 2A. This arrangement works to prevent interference between the air discharged from the duct 8A and the air discharged from the duct 8B, as shown in FIG. 10, and create whirling flows efficiently.

Figure 11:
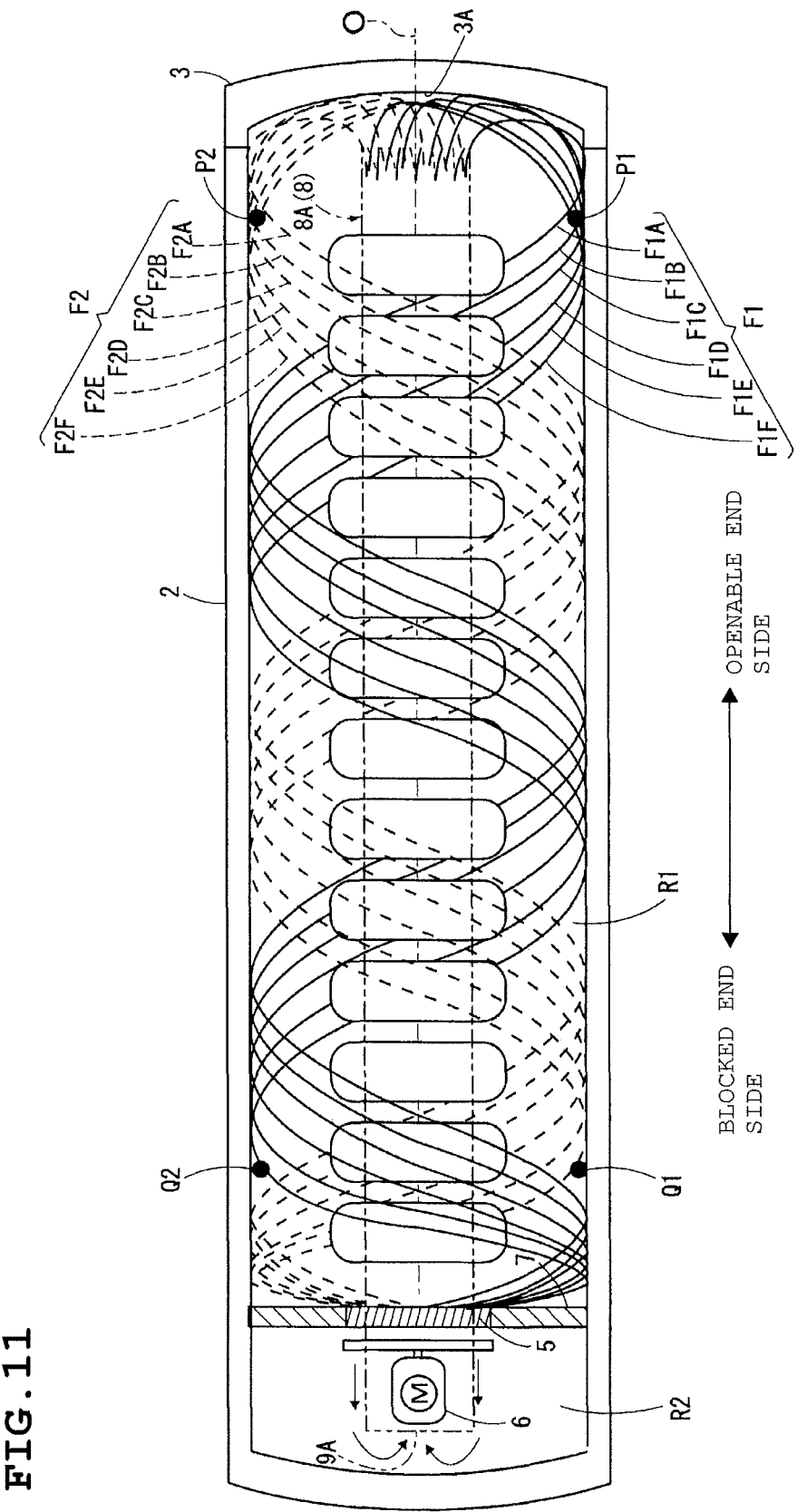
FIG. 11 is an illustration schematically showing the swirling flows of air occurring inside the pressurized chamber (second embodiment).

FIG. 11 is an illustration schematically showing the swirling flows of air occurring inside the pressurized chamber 2. In the figure, the solid lines represent the flows of air from the duct 8A, and the broken lines the flows of air from the duct 8B.

As shown in the figure, the air currents discharged at different angles from the partial ducts A to F after passing through the discharge plates 31 to 35 of the ducts 8A and 8B run into the airtight door 3, respectively, by flowing circumferentially along the inner peripheral wall surface 2A and then flow over the back face 3A of the airtight door 3. Then the air currents having flowed along the back face 3A of the airtight door 3 cause flows circling circumferentially along the inner peripheral wall surface 2A by flowing at their respective angles of inclination with respect to the inner peripheral wall surface 2A. Further, the rotating air currents flow spirally in circles along the inner peripheral wall surface 2A from the airtight door 3 side to the blocked end side. And these swirling flows within the pressurized chamber 2 will be taken into the air supply region R2 after passing through the heat source 5 provided in the bulkhead 7.

More specifically, the air currents discharged oriented by the discharge plates 31 to 35 of the duct 8A will turn into one set of whirling flows F1 as shown in FIG. 11 by flowing downward at different angles along the inner peripheral wall surface 2A, whereas the air currents discharged from the discharge plates 20 of the duct 8B will turn into the other set of whirling flows F2 as shown in FIG. 11 by flowing upward along the inner peripheral wall surface 2A. Also, since the ducts 8A and 8B are disposed facing each other at equal intervals, the whirling flows F1 and F2 will be the flows a half cycle out of step with each other.

As shown in the figure, the one set of whirling flows F1 consists of the flow F1A discharged from the partial duct A of the duct 8A, the flow F1B discharged from the partial duct B, the flow F1C discharged from the partial duct C, the flow F1D discharged from the partial duct D, the flow F1E discharged from the partial duct E, and the flow F1F discharged from the partial duct F. Also, the other set of whirling flows F2 consists of the flow F2A discharged from the partial duct A of the duct 8B, the flow F2B discharged from the partial duct B, the flow F2C discharged from the partial duct C, the flow F2D discharged from the partial duct D, the flow F2E discharged from the partial duct E, and the flow F2F discharged from the partial duct F. That is, changing the curvatures of the discharge plates 31 to 35 constituting the partial ducts A to F can control the width W of the whirling flow F1 of the flows F1A to F1F and the width W of the whirling flow F2 of the flows F2A to F2F. Therefore, if the curvatures of the discharge plates 31 to 35 are so changed as to narrow the distance between the flow F1F of the whirling flow F1 and the flow F2A of the whirling flow F2, then it will be possible to create strong whirling flows F1 and F2 that cover the entirety of the curing region R1.

As described above, the present embodiment can realize a temperature rise nearly uniform in the lengthwise direction of the pressurized chamber 2. Therefore, the curing of a plurality of tires 10 held side by side in the lengthwise direction of the pressurized chamber 2 can be performed with a uniform temperature rise irrespective of the positions of the tires 10 in the pressurized chamber 2. Moreover, the uniform temperature rise occurs in both the upper and lower parts of the pressurized chamber 2. Therefore, the individual tires are subjected to a uniform heating with circumferentially uniform temperature rise, and the whole tire is cured evenly.

Third Embodiment

In the second embodiment, the plurality of discharge plates 31 to 35 are curved at different curvatures from each other. A third embodiment of the invention differs from the second embodiment in that the discharge plates 31 to 35 are twisted at different angles in one direction from the rear ends 31B to 35B to the front ends 31A to 35A.

Figure 12A:
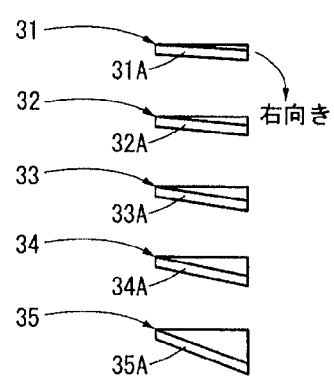
FIG. 12 is a front view and a side view of discharge plates of another embodiment (third embodiment).

FIG. 12A is a front view of the discharge plates 31 to 35 according to the third embodiment, and FIG. 12E a side view of the discharge plates 31 to 35 according to the third embodiment.

Figure 12B:
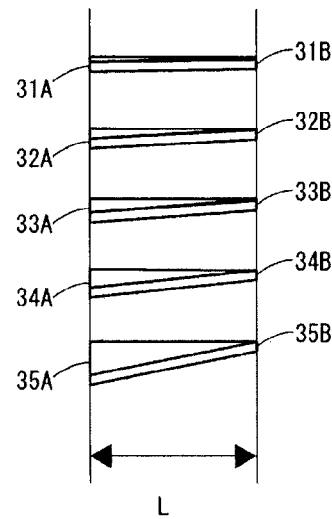

Hereinbelow, a description is given of this embodiment with reference to FIGS. 12A and 12B. Note that the identical components to those of the second embodiment are given the identical reference numerals, and the repeated description thereof will be omitted. Also, the description is based on the assumption that the structure of the ducts 8A and 8B and the interval at which the discharge plates 31 to 35 are located are the same as those of the second embodiment.

In the third embodiment, the discharge plates 31 to 35 are twisted at different angles toward the inner peripheral wall surface from the rear ends 31B to 35B to the front ends 31A to 35A. In this embodiment, the description will be given on the assumption that, when the discharge plates 31 to 35 disposed within the duct A are viewed from front, the air conduit plate 22 side of the front ends 31A to 35A are twisted clockwise toward the inner peripheral wall surface 2A at the front ends 31A to 35A (see FIG. 12). The discharge plates 31 to 35 are formed such that the angle of twist of the discharge plate 31 is the smallest, the angle of twist of the discharge plate 32 is the second smallest, the angle of twist of the discharge plate 33 is the third smallest, the angle of twist of the discharge plate 34 is the fourth smallest, and the angle of twist of the discharge plate 35 is the fifth smallest. In other words, the angle of twist is set greater in the order of the discharge plate 31, the discharge plate 32, the discharge plate 33, the discharge plate 34, and the discharge plate 35. Also, the discharge plates 31 to 35 are disposed such that the angle of twist increases incrementally from one circumferential end to the other circumferential end of the ducts 8A and 8B, respectively. Note that the lengths of the discharge plates 31 to 35 are set such that the straight line length L from the rear ends 31B to 35B to the front ends 31A to 35A is 10 to 30 cm, in the same way as in the first embodiment and the second embodiment.

More specifically, in one duct 8A, the discharge plate 31 with the smallest angle of twist is disposed in the topmost position. And, below it, the discharge plate 32, the discharge plate 33, the discharge plate 34, and the discharge plate 35 are disposed downward in this order with incrementally larger angles of twist.

Also, in the other duct 8B, the air conduit plate 22 side of the front ends 31A to 35A is twisted clockwise toward the inner peripheral wall surface 2A. And the discharge plate 31 with the smallest angle of twist is disposed in the bottommost position. And, above it, the discharge plate 32, the discharge plate 33, the discharge plate 34, and the discharge plate 35 are disposed upward in this order with incrementally larger angles of twist.

Thus the partial ducts A to F defined by the discharge plates 31 to 35 are formed in the air outlets of the ducts 8A and 8B.

Figure 13:
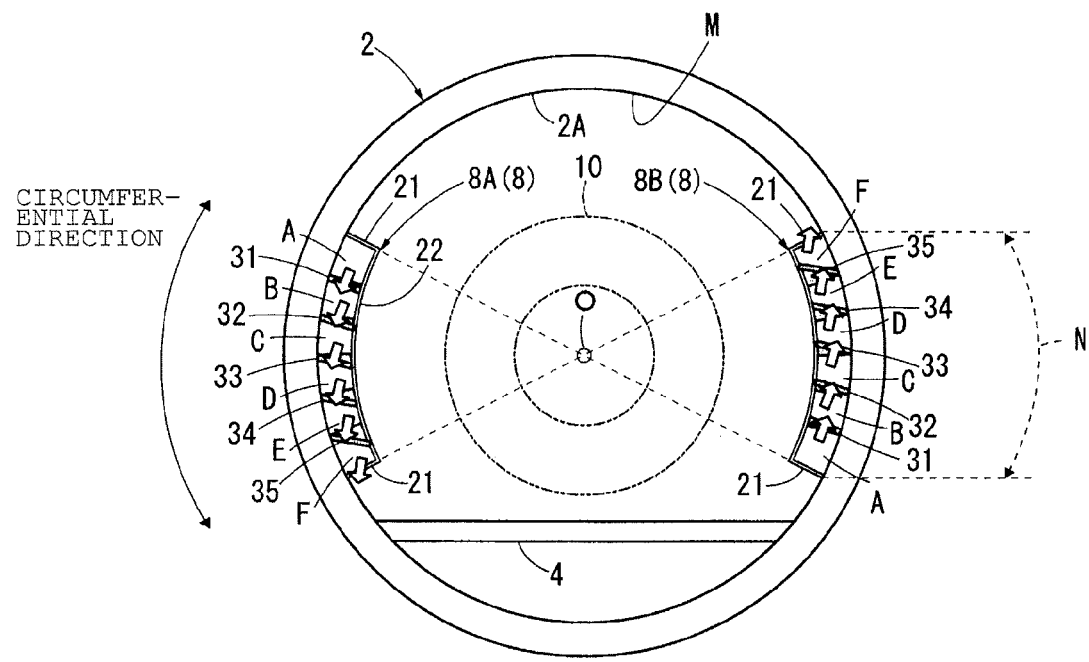
FIG. 13 is a diagram showing the directions of air discharged from partial ducts (third embodiment).

FIG. 13 is a diagram showing the directions of air discharged from the partial ducts A to F formed in the duct 8A. As shown in the figure, the air from the partial duct A of the duct 8A is discharged a little downward along the inner peripheral wall surface 2A in such a manner that it is pushed toward the inner peripheral wall surface 2A by the twist of the front end 31A of the discharge plate 31. The air from the partial duct B is discharged a little downward along the inner peripheral wall surface 2A in such a manner that it is pushed more forcibly than the air discharged from the partial duct A toward the inner peripheral wall surface 2A by the twist of the front end 31A of the discharge plate 31 and the front end 32A of the discharge plate 32. The air from the partial duct C is discharged a little downward along the inner peripheral wall surface 2A in such a manner that it is pushed more forcibly than the air discharged from the partial duct B toward the inner peripheral wall surface 2A by the twist of the front end 32A of the discharge plate 32 and the front end 33A of the discharge plate 33. The air from the partial duct D is discharged a little downward along the inner peripheral wall surface 2A in such a manner that it is pushed more forcibly than the air discharged from the partial duct C toward the inner peripheral wall surface 2A by the twist of the front end 33A of the discharge plate 33 and the front end 34A of the discharge plate 34. The air from the partial duct E is discharged a little downward along the inner peripheral wall surface 2A in such a manner that it is pushed more forcibly than the air discharged from the partial duct D toward the inner peripheral wall surface 2A by the twist of the front end 34A of the discharge plate 34 and the front end 35A of the discharge plate 35. And the air from the partial duct F is discharged a little downward along the inner peripheral wall surface 2A in such a manner that it is pushed more forcibly than the air discharged from the partial duct E toward the inner peripheral wall surface 2A by the twist of the front end 35A of the discharge plate 35.

Also, the air from the partial duct A of the duct 8B is discharged a little upward along the inner peripheral wall surface 2A in such a manner that it is pushed toward the inner peripheral wall surface 2A by the twist of the front end 31A of the discharge plate 31. The air from the partial duct B is discharged a little upward along the inner peripheral wall surface 2A in such a manner that it is pushed more forcibly than the air discharged from the partial duct A toward the inner peripheral wall surface 2A by the twist of the front end 31A of the discharge plate 31 and the front end 32A of the discharge plate 32. The air from the partial duct C is discharged a little upward along the inner peripheral wall surface 2A in such a manner that it is pushed more forcibly than the air discharged from the partial duct B toward the inner peripheral wall surface 2A by the twist of the front end 32A of the discharge plate 32 and the front end 33A of the discharge plate 33. The air from the partial duct D is discharged a little upward along the inner peripheral wall surface 2A in such a manner that it is pushed more forcibly than the air discharged from the partial duct C toward the inner peripheral wall surface 2A by the twist of the front end 33A of the discharge plate 33 and the front end 34A of the discharge plate 34. The air from the partial duct E is discharged a little upward along the inner peripheral wall surface 2A in such a manner that it is pushed more forcibly than the air discharged from the partial duct D toward the inner peripheral wall surface 2A by the twist of the front end 34A of the discharge plate 34 and the front end 35A of the discharge plate 35. And the air from the partial duct F is discharged a little upward along the inner peripheral wall surface 2A in such a manner that it is pushed more forcibly than the air discharged from the partial duct E toward the inner peripheral wall surface 2A by the twist of the front end 35A of the discharge plate 35.

That is, the air having passed through the duct 8B is discharged in circumferentially different directions by the plurality of partial ducts A to F formed by the plurality of discharge plates in the air outlet 9B. And the air flow discharged from the partial ducts A to F formed in the duct 8A and the air flow discharged from the partial ducts A to F formed in the duct 8B are the flows symmetrical about the autoclave center O.

The arrangement of the discharge plates 31 to 35 in this embodiment can also create whirling flows F1 and F2 that can cover the entire interior of the pressurized chamber 2.

That is, the discharge plates 31 to 35 are disposed such that they are twisted at different angles toward the inner peripheral wall surface from the rear ends 31B to 35B to the front ends 31A to 35A with the angle of twist increasing in the circumferential direction of the ducts 8A and 8B. As a result, the air currents discharged from the partial ducts A to F formed in the ducts 8A and 8B flow at circumferentially different angles and with different strengths along the inner peripheral wall surface 2A as shown in FIG. 9. Then they flow across over the back face 3A of the airtight door 3 as shown in FIG. 10, thereby creating whirling flows F1 and F2 that cover the entire interior of the pressurized chamber 2 as shown in FIG. 11.

Thus it is possible to realize a temperature rise nearly uniform in the lengthwise direction in the pressurized chamber 2. Therefore, the curing of a plurality of tires 10 held side by side in the lengthwise direction of the pressurized chamber 2 can be performed with a uniform temperature rise irrespective of the positions of the tires 10 in the pressurized chamber 2. Moreover, the uniform temperature rise occurs in both the upper and lower parts of the pressurized chamber 2. Therefore, the individual tires are subjected to a uniform heating with circumferentially uniform temperature rise, and the whole tire is cured evenly.

In the second embodiment, the plurality of discharge plates 31 to 35 are curved at different curvatures from each other in the extension direction. And in the third embodiment, the discharge plates 31 to 35 are twisted at different angles in one direction from the rear ends 31B to 35B to the front ends 31A to 35A. A fourth embodiment of the invention differs from the second embodiment and the third embodiment in that the plurality of discharge plates 31 to 35 are curved at different curvatures from each other in the extension direction and are further twisted at different angles in one direction from the rear ends 31B to 35B to the front ends 31A to 35A in the extension direction.

Figure 14A:
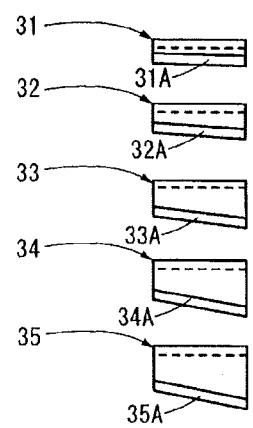
FIG. 14 is a front view and a side view of discharge plates of another embodiment (fourth embodiment).
Figure 14B:
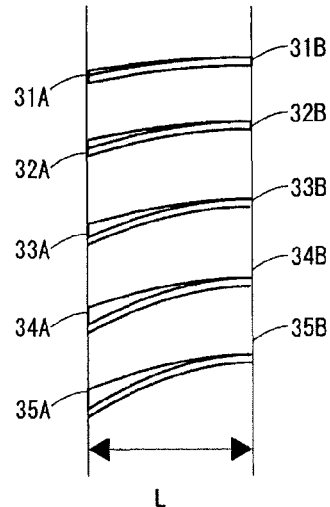

FIG. 14A is a front view of the discharge plates 31 to 35 according to the fourth embodiment, and FIG. 14B a side view of the discharge plates 31 to 35 according to the fourth embodiment. Hereinbelow, a description is given of this embodiment with reference to FIGS. 14A and 14B. Note that the identical components to those of the first embodiment are given the identical reference numerals, and the repeated description thereof will be omitted. Also, the description is based on the assumption that the structure of the ducts 8A and 8B and the interval at which the discharge plates 31 to 35 are located apart from each other are the same as those of the second embodiment and the third embodiment.

In the fourth embodiment, the discharge plates 31 to 35 are curved at different curvatures from each other in the extension direction and twisted at different angles in one direction toward the inner peripheral wall surface from the rear ends 31B to 35B to the front ends 31A to 35A. Note that the description will be given on the assumption that, when the discharge plates 31 to 35 disposed within the duct A are viewed from front, the twist of the discharge plates 31 to 35 looks such that the air conduit plate 22 side of the front ends 31A to 35A are twisted clockwise toward the inner peripheral wall surface 2A at the front ends 31A to 35A (see FIG. 14).

For example, the discharge plates 31 to 35 are formed such that the curvature and the angle of twist of the discharge plate 31 is the smallest, the curvature and the angle of twist of the discharge plate 32 is the second smallest, the curvature and the angle of twist of the discharge plate 33 is the third smallest, the curvature and the angle of twist of the discharge plate 34 is the fourth smallest, and the curvature and the angle of twist of the discharge plate 35 is the fifth smallest. In other words, the curvature and the angle of twist are set greater in the order of the discharge plate 31, the discharge plate 32, the discharge plate 33, the discharge plate 34, and the discharge plate 35. Note that the lengths of the discharge plates 31 to 35 are set such that the straight line length 21 from the rear ends 31B to 35B to the front ends 31A to 35A is 10 to 30 cm, in the same way as in the first to third embodiments.

More specifically, in one duct 8A, the discharge plates 31 to 35 are so disposed that they are curved downward. The discharge plate 31 with the smallest curvature and angle of twist is disposed in the topmost position. And, below it, the discharge plate 32, the discharge plate 33, the discharge plate 34, and the discharge plate 35 are disposed downward in this order with incrementally larger curvatures and angles of twist. Also, in the other duct 8B, the discharge plates 31 to 35 are so disposed that they are curved upward. The discharge plate 31 with the smallest curvature and angle of twist is disposed in the bottommost position. And, above it, the discharge plate 32, the discharge plate 33, the discharge plate 34, and the discharge plate 35 are disposed upward in this order with incrementally larger curvatures and angles of twist.

Thus the partial ducts A to F defined by the discharge plates 31 to 35 are formed in the air outlets of the ducts 8A and 8B.

Figure 15:
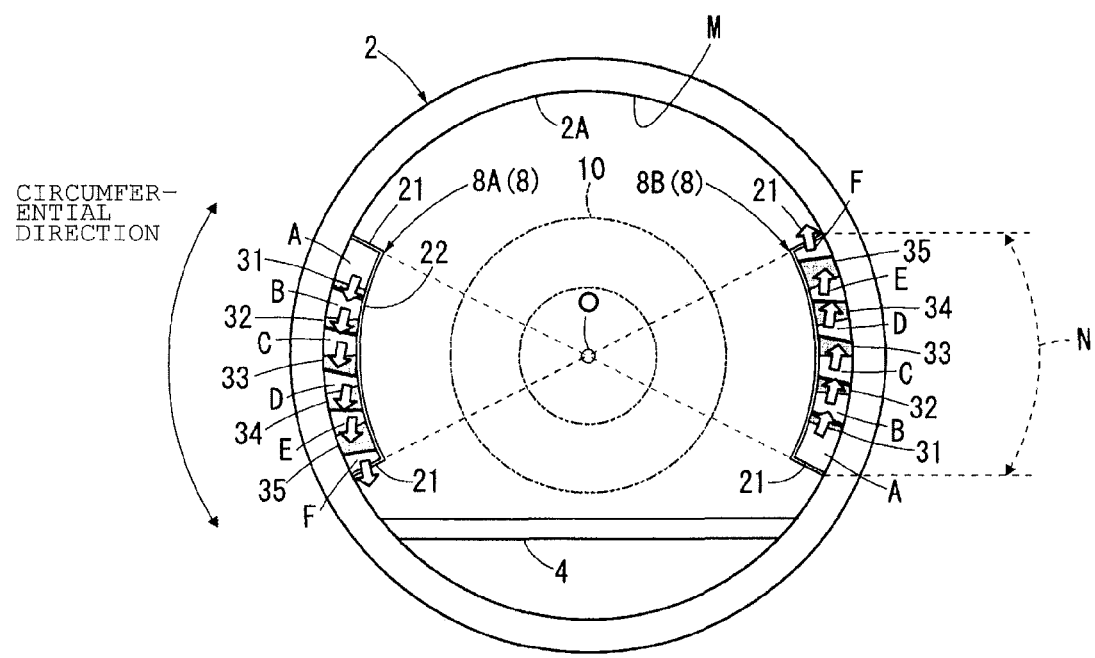
FIG. 15 is a diagram showing the directions of air discharged from partial ducts (fourth embodiment).

FIG. 15 is a diagram showing the directions of air discharged from the partial ducts A to F formed in the duct 8A. As shown in the figure, the air from the partial duct A of the duct 8A is discharged a little downward from the extension direction of the duct 8A in such a manner that it is pushed toward the inner peripheral wall surface 2A by the twist of the front end 31A in addition to the curvature of the discharge plate 31. The air from the partial duct B is discharged a little more downward than the air discharged from the partial duct A in such a manner that it is pushed toward the inner peripheral wall surface 2A by the twists of the front ends 31A and 32A in addition to the curvatures of the discharge plates 31 and 32. The air from the partial duct C is discharged a little more downward than the air discharged from the partial duct B in such a manner that it is pushed toward the inner peripheral wall surface 2A by the twists of the front ends 32A and 33A in addition to the curvatures of the discharge plates 32 and 33. The air from the partial duct D is discharged a little more downward than the air discharged from the partial duct C in such a manner that it is pushed toward the inner peripheral wall surface 2A by the twists of the front ends 33A and 34A in addition to the curvatures of the discharge plates 33 and 34. The air from the partial duct E is discharged a little more downward than the air discharged from the partial duct D in such a manner that it is pushed toward the inner peripheral wall surface 2A by the twists of the front ends 34A and 35A in addition to the curvatures of the discharge plates 34 and 35. And the air from the partial duct F is discharged a little more downward than the air discharged from the partial duct B in such a manner that it is pushed toward the inner peripheral wall surface 2A by the twist of the front end 35A in addition to the curvature of the discharge plate 35.

That is, the air having passed through the duct 8A is discharged in circumferentially different directions by the plurality of partial ducts A to F formed by the plurality of discharge plates 31 to 35 in the air outlet 9B.

Also, the air from the partial duct A of the duct 8B is discharged a little upward from the extension direction of the duct 8B in such a manner that it is pushed toward the inner peripheral wall surface 2A by the twist of the front end 31A in addition to the curvature of the discharge plate 31. The air from the partial duct B is discharged a little more upward than the air discharged from the partial duct A in such a manner that it is pushed toward the inner peripheral wall surface 2A by the twists of the front ends 31A and 32A in addition to the curvatures of the discharge plates 31 and 32. The air from the partial duct C is discharged a little more upward than the air discharged from the partial duct B in such a manner that it is pushed toward the inner peripheral wall surface 2A by the twists of the front ends 32A and 33A in addition to the curvatures of the discharge plates 32 and 33. The air from the partial duct D is discharged a little more upward than the air discharged from the partial duct C in such a manner that it is pushed toward the inner peripheral wall surface 2A by the twists of the front ends 33A and 34A in addition to the curvatures of the discharge plates 33 and 34. The air from the partial duct E is discharged a little more upward than the air discharged from the partial duct D in such a manner that it is pushed toward the inner peripheral wall surface 2A by the twists of the front ends 34A and 35A in addition to the curvatures of the discharge plates 34 and 35. And the air from the partial duct F is discharged a little more upward than the air discharged from the partial duct E in such a manner that it is pushed toward the inner peripheral wall surface 2A by the twist of the front end 35A in addition to the curvature of the discharge plate 35.

That is, the air having passed through the duct 8B is discharged in circumferentially different directions by the plurality of partial ducts A to F formed by the plurality of discharge plates 31 to 35 in the air outlet 9B. Thus, these currents become a flow symmetrical about the autoclave center O with the air flow discharged from the partial ducts A to F formed in the duct 8A, thereby creating major flows of air in one direction.

The arrangement of the discharge plates 31 to 35 in this embodiment can also create whirling flows F1 and F2 that can cover the entire interior of the pressurized chamber 2.

That is, the arrangement is such that the discharge plates 31 to 35 are curved lengthwise at different curvatures from each other in one direction and are further twisted at different angles in one direction from the rear ends 31B to 35B to the front ends 31A to 35A in the extension direction. In each of the ducts 8A and 8B, the curvatures and twists of the discharge plates 31 to 35 along the circumferential direction are in the same direction and the angles of curvature and twist along the circumferential direction of the discharge plates 31 to 35 are incrementally larger. As a result, the air currents discharged from the partial ducts A to F formed in the ducts 8A and 8B flow at circumferentially different angles and with different strengths along the inner peripheral wall surface 2A as shown in FIG. 9. Then they flow over the back face 3A of the airtight door 3 as shown in FIG. 10, thereby creating whirling flows F1 and F2 that cover the entire interior of the pressurized chamber 2 as shown in FIG. 11.

Thus the heating can be accomplished with a temperature rise nearly uniform in the lengthwise direction inside the pressurized chamber 2. Hence, the curing of a plurality of tires 10 held side by side in the lengthwise direction of the pressurized chamber 2 can be performed with a uniform temperature rise irrespective of the positions of the tires 10 in the pressurized chamber 2. Moreover, the uniform temperature rise occurs in both the upper and lower parts of the pressurized chamber 2. Therefore, the individual tires are subjected to a uniform heating with circumferentially uniform temperature rise, and the whole tire is cured evenly.

As described in the second to fourth embodiments, a pair of ducts 8A and 8B are disposed at horizontal positions of an autoclave, and a plurality of discharge plates are disposed in each of the ducts 8A and 8B to discharge air therefrom at different angles in the same circumferential direction. This makes it possible to create stronger whirling flows that cover the entire interior of the pressurized chamber, thereby achieving nearly uniform temperature rise within the pressurized chamber. As a result, a uniform curing of tires 10 can be performed irrespective of the positions of the tires 10 where they are held inside the pressurized chamber.

Note that the description thus far has been based on the assumption that the discharge plates 31 to 35 are curved. However, the arrangement may be such that the discharge plates 31 to 35 to be disposed inside the ducts 8A and 8B are bent at different angles, respectively.

Fifth Embodiment

The structures of an autoclave 1 as described in the first to fourth embodiments are only examples and may be other structures. For example, although the duct 8 to be disposed in the autoclave 1 is a pair of ducts 8A and 8B in the first to fourth embodiments, the other forms of duct 8 to be installed in the autoclave 1 may be such as shown in FIGS. 16A to 16D. FIGS. 16A to 16D represent examples in which the discharge plates 20 of the first embodiment are installed in the duct(s) 8.

Figure 16A:
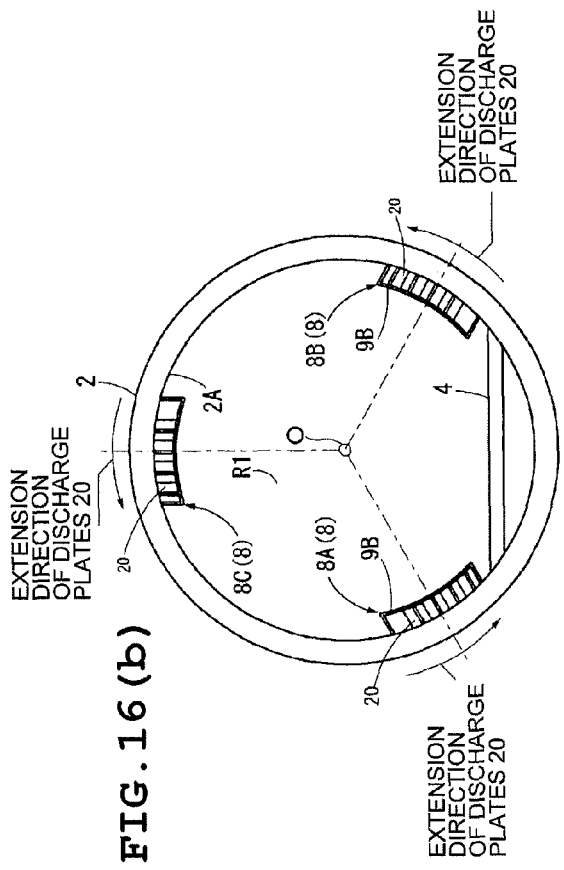
FIG. 16 is illustrations schematically showing other embodiments of duct arrangement (fifth to eighth embodiments).

FIG. 16A differs from the first embodiment in that the duct 8 is provided all along the inner peripheral wall surface 2A. Otherwise, it is the same as the first embodiment. In the following description, note that the identical components to those of the first embodiment are given the identical reference numerals given in FIGS. 1 to 3, and the repeated description thereof will be omitted. Also, note that the variations (modifications) applicable to the identical components of the first to fourth embodiments are also applicable to this embodiment.

The duct 8 according to this embodiment, as shown in FIG. 16A, has a cylindrical air conduit plate 22 secured to the inner peripheral wall surface 2A of the pressurized chamber 2 by a not-shown method and sends heated air from the air supply region R2 to the airtight door 3 side through the passages between the inner peripheral wall surface 2A and the air conduit plate 22. Inside the duct 8, a plurality of discharge plates 20 extending in the same circumferential direction are disposed at circumferentially equal intervals between the inner peripheral wall surface 2A and the air conduit plate 22 on the airtight door 3 side.

That is, the air currents from the air outlet 9B of the duct 8 are discharged in a circumferential direction along the inner peripheral wall surface 2A and run into the airtight door 3. Then the air currents having run into the airtight door 3 become spirally rotating currents along the inner peripheral surface of the air conduit plate 22 and flow from the openable end side to the blocked end side. As a result, there will be no stagnations of heated air inside the curing region R1, and the temperature rise will be uniform in the whole area within the curing region R1.

Accordingly, the structure of the duct 8 in this embodiment can achieve the same effects as in the above-mentioned embodiments.

Also, in this fifth embodiment, the discharge plates 31 to 35 described in the second to fourth embodiments can be applied in the place of the discharge plates 20. In this case, each unit of discharge plates 31 to 35 may be placed repeatedly all along the inner peripheral wall surface 2A in such a manner that the extension direction of the respective units of discharge plates 31 to 35 is the same circumferential direction.

Sixth Embodiment

Figure 16B:
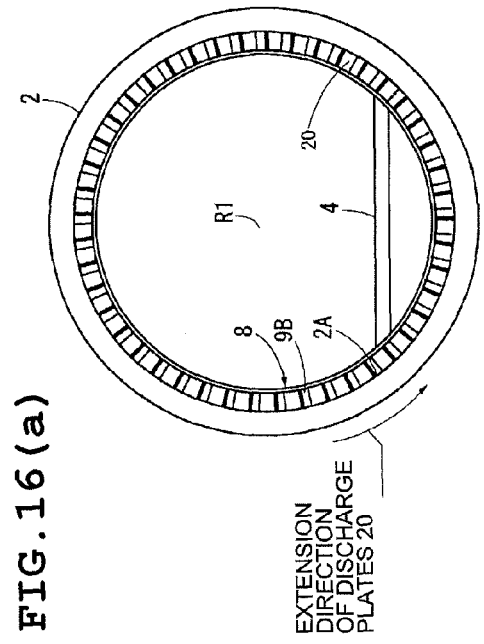

Also, as another embodiment of the duct 8 to be disposed in the autoclave 1, a sixth embodiment of the present invention, as shown in FIG. 16B, differs from the first to fifth embodiments in that three ducts 8 are disposed at circumferentially equal intervals on the inner peripheral wall surface 2A of the pressurized chamber 2.

More specifically, the ducts 8A, 8B, and 8C of this embodiment, as shown in FIG. 16B, are disposed in three positions at circumferentially equal intervals on the inner peripheral wall surface 2A of the pressurized chamber 2. Formed in each of the ducts 8A, 8B, and 8C are a plurality of discharge plates 20 extending in the same circumferential direction.

That is, the air currents from the air outlets 9B of the ducts 8A, 8B, and 8C of this embodiment are discharged respectively in a circumferential direction along the inner peripheral wall surface 2A and run into the airtight door 3. Then the air currents having run into the airtight door 3 become rotating currents of uniform flow speed along the inner peripheral wall surface 2A and flow from the openable end side to the blocked end side. As a result, there will be no stagnations of heated air inside the curing region R1, and the temperature rise will be uniform in the whole area within the curing region R1. Accordingly, the structure of the duct 8 in this embodiment can achieve the same effects as in the above-mentioned embodiments.

Also, in this sixth embodiment, the discharge plates 31 to 35 described in the second to fourth embodiments can be applied to the ducts 8A, 8B, and 8C in the place of the discharge plates 20.

Seventh Embodiment

Figure 16C:
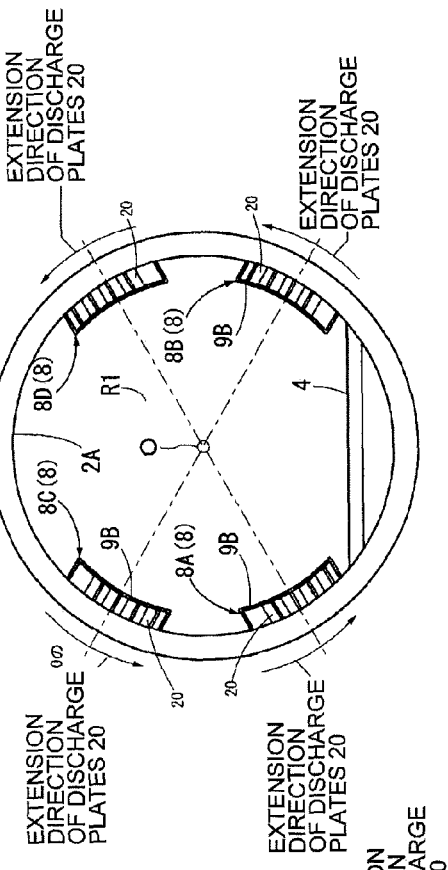

Also, as another embodiment of the duct 8 to be disposed in the autoclave 1, a seventh embodiment as shown in FIG. 16C differs from the first to sixth embodiments in that the ducts 8 are disposed in four diagonal positions at circumferentially equal intervals on the inner peripheral wall surface 2A of the pressurized chamber 2.

More specifically, the ducts 8A, 8B, 8C, and 8D of this embodiment, as shown in FIG. 16C, are disposed in four diagonal positions at circumferentially equal intervals on the inner peripheral wall surface 2A of the pressurized chamber 2. Formed in each of the ducts 8A, 8B, 8C, and 8D are a plurality of discharge plates 20 extending in the same circumferential direction. Note that the duct 8D is located diagonally opposite from the duct 8A, whereas the duct 8C is located diagonally opposite from the duct 8B.

That is, the air currents from the air outlets 9B of the ducts 8A, 8B, 8C, and 8D of this embodiment are discharged respectively in a circumferential direction along the inner peripheral wall surface 2A and run into the airtight door 3. Then the air currents having run into the airtight door 3 become rotating currents of uniform flow speed along the inner peripheral wall surface 2A and flow from the openable end side to the blocked end side. As a result, there will be no stagnations of heated air inside the curing region R1, and the temperature rise will be uniform in the whole area within the curing region R1. Accordingly, the structure of the duct 8 in this embodiment can achieve the same effects as in the first to sixth embodiments.

Eighth Embodiment

Figure 16D:
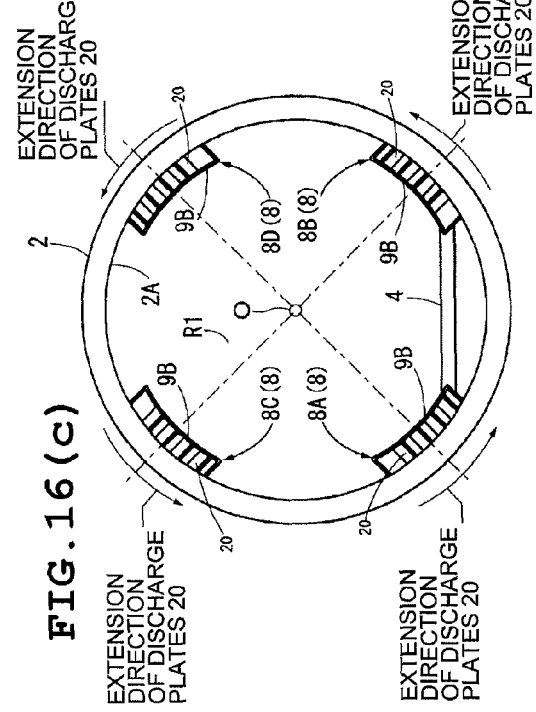

Also, as another embodiment of the duct 8 to be disposed in the autoclave 1, an eighth embodiment as shown in FIG. 16D differs from the first to seventh embodiments in that the ducts 8 are disposed at four diagonally opposite circumferential positions on the inner peripheral wall surface 2A of the pressurized chamber 2 above the floor board.

More specifically, the ducts 8A, 8B, 8C, and 8D of this embodiment, as shown in FIG. 16D, are disposed at four diagonally opposite positions at circumferentially equal intervals on the inner peripheral wall surface 2A of the pressurized chamber 2. Formed in each of the ducts 8A, 8B, 8C, and 8D are a plurality of discharge plates 20 extending in the same circumferential direction. Note that the duct 8D is located diagonally opposite from the duct 8A, and the duct 8C is located diagonally opposite from the duct 8B. Also, the combination of the duct 8A and the duct 8C and the combination of the duct 8B and the duct 8D are located in evenly divided circumferential positions.

That is, the air currents from the air outlets 9B of the ducts 8A, 8B, 8C, and 8D of this embodiment are discharged respectively in a circumferential direction along the inner peripheral wall surface 2A and run into the airtight door 3. Then the air currents having run into the airtight door 3 become spirally rotating currents along the inner peripheral wall surface 2A and flow from the openable end side to the blocked end side. As a result, there will be no stagnations of heated air inside the curing region R1, and the temperature rise will be uniform in the whole area within the curing region R1. Accordingly, the structure of the duct 8 in this embodiment can achieve the same effects as in the above-mentioned embodiments. Moreover, the location of the ducts 8A, 8B, 8C, and 8D at four diagonally opposite circumferential positions on the inner peripheral wall surface 2A of the pressurized chamber 2 makes it no longer necessary to raise the durability of the floor board to protect the ducts 8A, 8B, 8C, and 8D from the workers or carriages that pass thereon. This will help reduce the manufacturing cost.

Also, in this seventh embodiment, the discharge plates 31 to 35 described in the second to fourth embodiments can be applied to the ducts 8A, 8B, 8C, and 8D in the place of the discharge plates 20.

As described thus far, according to the present invention, a plurality of tires 10 are held side by side in the lengthwise direction inside a cylindrical pressurized chamber 2. Then, upon sealing the pressurized chamber 2, the heat source 5 and the fan 6 placed at the blocked end side, which is the one end side of the pressurized chamber 2 interior, are driven so that the air blown through a plurality of ducts 8 by the fan 6 is discharged at the openable end side, which is the other end side of the pressurized chamber 2. The air currents from the air outlets 9B of the plurality of ducts 8 are discharged in the same circumferential direction of the pressurized chamber 2. Thus, the plurality of tires 10 can be cured with the temperatures within the pressurized chamber 2 made uniform by the swirling flows of air rotating circumferentially inside the pressurized chamber 2.

That is, the air heated by the heat source 5 and having flowed into the openable end side of the pressurized chamber 2 from the air supply region R2 through the fan 6 and the plurality of ducts 8 is discharged in the same circumferential direction along the inner peripheral wall surface 2A of the pressurized chamber 2 from the discharge plates 20 disposed in the air outlets 9B of the ducts 8 at inclination toward the same circumferential direction. As a result, the air flowing from the openable end side to the blocked end side turns into whirling flows rotating circumferentially inside the pressurized chamber. This causes forced convections in the entire interior of the pressurized chamber 2, eliminating stagnations of air flow therein. Consequently, the air heated by the heat source reaches all parts within the pressurized chamber and thus realizes a uniform temperature distribution in the pressurized chamber 2. Hence, the autoclave according to the present invention can cure the tires 10 to a uniform degree of curing irrespective of their positions in the lengthwise direction of the pressurized chamber 2 and the circumferential positions of each tire 10.

Also, although not shown, as another embodiment, the discharge plates 20 may be provided on the airtight door 3 of the pressurized chamber 2 in the place of the discharge plates 20 inside the ducts 8.

More specifically, the discharge plates of this embodiment are disposed on the airtight door 3 in positions on the extension of the ducts 8 in such a manner that they extend in the same circumferential direction along the inner peripheral wall surface 2A of the pressurized chamber 2.

That is, the air discharged from the air outlets 9B of the ducts 8 runs into the airtight door 3. Then the air having run into the airtight door 3 is guided in a circumferential direction by the discharge plates 20. Then the air flows along the inner peripheral wall surface 2A and becomes spirally whirling flows advancing from the openable end side to the blocked end side. With the whirling flows occurring inside the pressurized chamber 2, there will be no stagnations of heated air inside the curing region R1, and the temperature rise will be uniform in the whole area within the curing region R1. Accordingly, the arrangement of the discharge plates 20 as in this embodiment can achieve the same effects as in the foregoing embodiments.

Also, in the foregoing embodiments, it has been described that a heat source 5 and a fan 6, which are disposed on the blocked end side which is one end side of the pressurized chamber 2, are operated, and the air heated by the heat source 5 and blown by the fan 6 is discharged on the openable end side which is the other end side of the pressurized chamber 2. However, the arrangement may be such that the heat source 5 and the fan 6 are installed on the airtight door 3, for instance, on the openable end side which is the other end side of the pressurized chamber 2. And the air blown by the fan 6 is sent through a plurality of ducts 8 and discharged to the blocked end side which is one end side of the pressurized chamber 2.

That is, the discharge plates 20 curved from inside the ducts 8 toward the air outlets and extending in a circumferential direction of the inner peripheral wall surface 2A as shown by the white arrows in FIG. 3 may be installed in the ducts 8 opening on the blocked end side, with the front ends 20A thereof terminating at nearly the same position as the air outlets of the ducts 8. The arrangement like this can also accomplish the curing of a plurality of tires 10 with uniform temperatures inside the pressurized chamber 2 by discharging air from the air outlets of a plurality of ducts 8 in the same circumferential direction of the pressurized chamber 2 and creating whirling flows rotating circumferentially inside the pressurized chamber 2.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

DESCRIPTION OF REFERENCE NUMERALS 1 autoclave
2 pressurized chamber
2A inner peripheral wall surface
3 airtight door
4 floor board
5 heat source
6 fan
6A motor
6B rotor blade
7 bulkhead
8, 8A to 8D duct
9A air inlet
9B air outlet
10 tire
20, 31 to 35 discharge plate
20A front end
21 plate piece
22 air conduit plate
F1, F2 whirling flow
R1 curing region
R2 air supply region

The invention claimed is:

1. An autoclave comprising:
a pressurized chamber of a cylindrical shape;
a heat source disposed inside the pressurized chamber at one end side thereof;
a fan disposed, in combination with the heat source, inside the pressurized chamber at one end side thereof;
a first duct extending lengthwise on an inner peripheral wall surface of the pressurized chamber to discharge air blown by the fan at the other end side thereof,
wherein an air outlet of the first duct is equipped, along a circumferential direction of the pressurized chamber, with a first plurality of plates that discharge the air blown by the fan in the circumferential direction of the pressurized chamber at different angles to each other with respect to a circumferential direction of the inner peripheral wall surface, and
wherein the first plurality of plates are twisted in an inner wall surface approaching direction at different angles from each other from one end side to the other end side of the pressurized chamber, such that each of the first plurality of plates has an angle of twist, the first plurality of plates are provided in such a manner that the first plurality of plates are twisted downward, the angles of twist are incrementally larger from one circumferential end to a second circumferential end of the first duct, and a plate of the first plurality of plates with a smallest angle of twist is disposed in a topmost position;
a second duct extending lengthwise on the inner peripheral wall surface of the pressurized chamber to discharge air blown by the fan at the other end side thereof,
wherein an air outlet of the second duct is equipped, along the circumferential direction of the pressurized chamber, with a second plurality of plates that discharge the air blown by the fan in the circumferential direction of the pressurized chamber at different angles to each other with respect to the circumferential direction of the inner peripheral wall surface, and
wherein the second plurality of plates are twisted in the inner peripheral wall surface approaching direction at different angles from each other from one end side to the other end side of the pressurized chamber, such that each of the first plurality of plates has an angle of twist, the second plurality of plates are provided in such a manner that the first plurality of plates are twisted upward, the angles of twist are incrementally larger from one circumferential end to a second circumferential end of the second duct, and a plate of the second plurality of plates with a smallest angle of twist is disposed in a bottommost position.

2. The autoclave according to claim 1, wherein the first duct and the second duct are disposed at circumferentially equal intervals on the inner peripheral wall surface of the pressurized chamber and the first plurality of plates and the second plurality of plates are so disposed in the air outlets as to extend in the circumferential direction of the inner peripheral wall surface.

3. The autoclave according to claim 1, wherein the first plurality of plates and the second plurality of plates are curved at different curvatures from one end side to the other end side of the pressurized chamber, and the curvatures of the first plurality of plates and the second plurality of plates are incrementally larger from one circumferential end to the other circumferential end of the first duct and the second duct.

4. The autoclave according to claim 1, wherein the first duct and the second duct are disposed diagonally opposite from each other at horizontal positions on the inner peripheral wall surface of the pressurized chamber, and the first plurality of plates and the second plurality of plates having a same shape are disposed in the ducts at positions symmetrical about an autoclave center.

5. The autoclave according to claim 1, wherein the first duct and the second duct are disposed at two positions on the inner peripheral wall surface of the pressurized chamber, and the first duct and the second duct are and spaced from each other.

6. The autoclave according to claim 1, wherein the first duct and the second duct are disposed above a floor board placed inside the pressurized chamber.

7. The autoclave according to claim 1, wherein the first duct and the second duct have a length, along the circumferential direction of the pressurized chamber, of 15% to 20% of an inner circumferential length of the pressurized chamber.

8. The autoclave according to claim 1, wherein the first plurality of plates and the second plurality of plates are disposed in the first duct and the second duct at intervals of 10 cm to 30 cm.

9. The autoclave according to claim 1, wherein the first plurality of plates and the second plurality of plates have lengths of 10 cm to 30 cm from one end side to the other end side of the pressurized chamber.

\* \* \* \* \*